United States Patent
Fujii

(10) Patent No.: US 9,606,341 B2
(45) Date of Patent: Mar. 28, 2017

(54) OPTICAL APPARATUS

(71) Applicant: OLYMPUS CORPORATION, Shibuya-ku, Tokyo (JP)

(72) Inventor: Shintaro Fujii, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 544 days.

(21) Appl. No.: 14/081,677

(22) Filed: Nov. 15, 2013

(65) Prior Publication Data

US 2014/0152795 A1 Jun. 5, 2014

(30) Foreign Application Priority Data

Dec. 5, 2012 (JP) .................................. 2012-265902

(51) Int. Cl.
| | |
|---|---|
| *G02B 21/36* | (2006.01) |
| *G02B 21/00* | (2006.01) |
| *G02B 21/16* | (2006.01) |
| *G02B 26/06* | (2006.01) |

(52) U.S. Cl.
CPC ............ *G02B 21/002* (2013.01); *G02B 21/16* (2013.01); *G02B 26/06* (2013.01)

(58) Field of Classification Search
CPC ............ G02B 26/0833; G02B 27/0068; G02B 21/0076; G02B 26/06; G02B 21/361; G02B 21/365; G01N 21/6456; G01N 21/6458
See application file for complete search history.

(56) References Cited

U.S. PATENT DOCUMENTS

| | | | | |
|---|---|---|---|---|
| 8,237,835 B1* | 8/2012 | Muller | ................. | A61B 3/1025 250/201.9 |
| 9,158,100 B2* | 10/2015 | Yokoi | ................. | G02B 21/0032 |

(Continued)

FOREIGN PATENT DOCUMENTS

| | | |
|---|---|---|
| JP | 06003599 A | 1/1994 |
| JP | 10325711 A | 12/1998 |

(Continued)

OTHER PUBLICATIONS

Japanese Office Action (and English translation thereof) dated Oct. 11, 2016, issued in counterpart Japanese Application No. 2012-265902.

*Primary Examiner* — Neil Mikeska
(74) *Attorney, Agent, or Firm* — Holtz, Holtz & Volek PC

(57) ABSTRACT

An optical apparatus includes: laser; objective that irradiates a sample with laser light; phase-modulation spatial light modulator that is located at a pupil conjugate position of the objective and modulates a phase of the laser light; scan unit that scans the sample with the laser light; detector that detects observation light from the sample; image generating unit that generates a sample image according to a signal from the detector and control information of the scan unit; and controlling unit that sets for the modulator a modulation amount of the phase of laser light in accordance with a pattern to be formed on the sample using the laser light. According to the pattern to be formed on the sample and a pattern of irradiation with the laser light obtained from the image generated by the image generating unit, the controlling unit corrects the modulation amount that is set for the modulator.

11 Claims, 18 Drawing Sheets

(56) References Cited

U.S. PATENT DOCUMENTS

| | | | | |
|---|---|---|---|---|
| 2003/0075667 A1* | 4/2003 | Schoeppe | G02B 21/006 | 250/201.3 |
| 2003/0132394 A1* | 7/2003 | Wolleschensky | G01N 21/6458 | 250/458.1 |
| 2005/0213188 A1* | 9/2005 | DeSimone | G02B 21/06 | 359/290 |
| 2007/0177787 A1* | 8/2007 | Maeda | G06T 7/001 | 382/141 |
| 2007/0273784 A1* | 11/2007 | Neil | H04N 5/235 | 348/362 |
| 2008/0265130 A1* | 10/2008 | Colomb | G01J 9/02 | 250/201.9 |
| 2009/0116707 A1* | 5/2009 | Sutko | G06K 9/00134 | 382/128 |
| 2009/0290156 A1* | 11/2009 | Popescu | G01N 15/1434 | 356/338 |
| 2009/0296207 A1* | 12/2009 | Goelles | G02B 21/008 | 359/385 |
| 2010/0108873 A1* | 5/2010 | Schwertner | G01B 11/2504 | 250/252.1 |
| 2010/0141829 A1* | 6/2010 | Jalali | A61B 1/00009 | 348/370 |
| 2010/0157422 A1* | 6/2010 | Ouchi | G02B 21/14 | 359/385 |
| 2010/0282956 A1* | 11/2010 | Kimba | H01J 37/28 | 250/252.1 |
| 2011/0006231 A1* | 1/2011 | Betzig | G01J 9/00 | 250/578.1 |
| 2011/0069136 A1* | 3/2011 | Hashimoto | B41J 19/16 | 347/255 |
| 2011/0102741 A1* | 5/2011 | Hirose | A61B 3/14 | 351/206 |
| 2011/0109958 A1* | 5/2011 | Yokoi | G02B 21/0032 | 359/363 |
| 2011/0116165 A1* | 5/2011 | Suzuki | G02B 21/18 | 359/388 |
| 2011/0182529 A1* | 7/2011 | Kempe | G01N 21/6458 | 382/274 |
| 2011/0193269 A1* | 8/2011 | Ito | B23K 26/032 | 264/400 |
| 2011/0233046 A1 | 9/2011 | Nikolenko et al. | | |
| 2014/0029091 A1* | 1/2014 | Kleppe | G02B 21/0076 | 359/385 |
| 2014/0368904 A1* | 12/2014 | Moertelmaier | G02B 21/0076 | 359/385 |
| 2015/0219937 A1* | 8/2015 | Matsumoto | B23K 26/032 | 359/279 |

FOREIGN PATENT DOCUMENTS

| | | |
|---|---|---|
| JP | 2009-082966 A | 4/2009 |
| JP | 2009-169021 A | 7/2009 |
| JP | 2011-099986 A | 5/2011 |
| JP | 2011128572 A | 6/2011 |
| JP | 2011128573 A | 6/2011 |
| JP | 2011237635 A | 11/2011 |
| JP | 2012008260 A | 1/2012 |

* cited by examiner

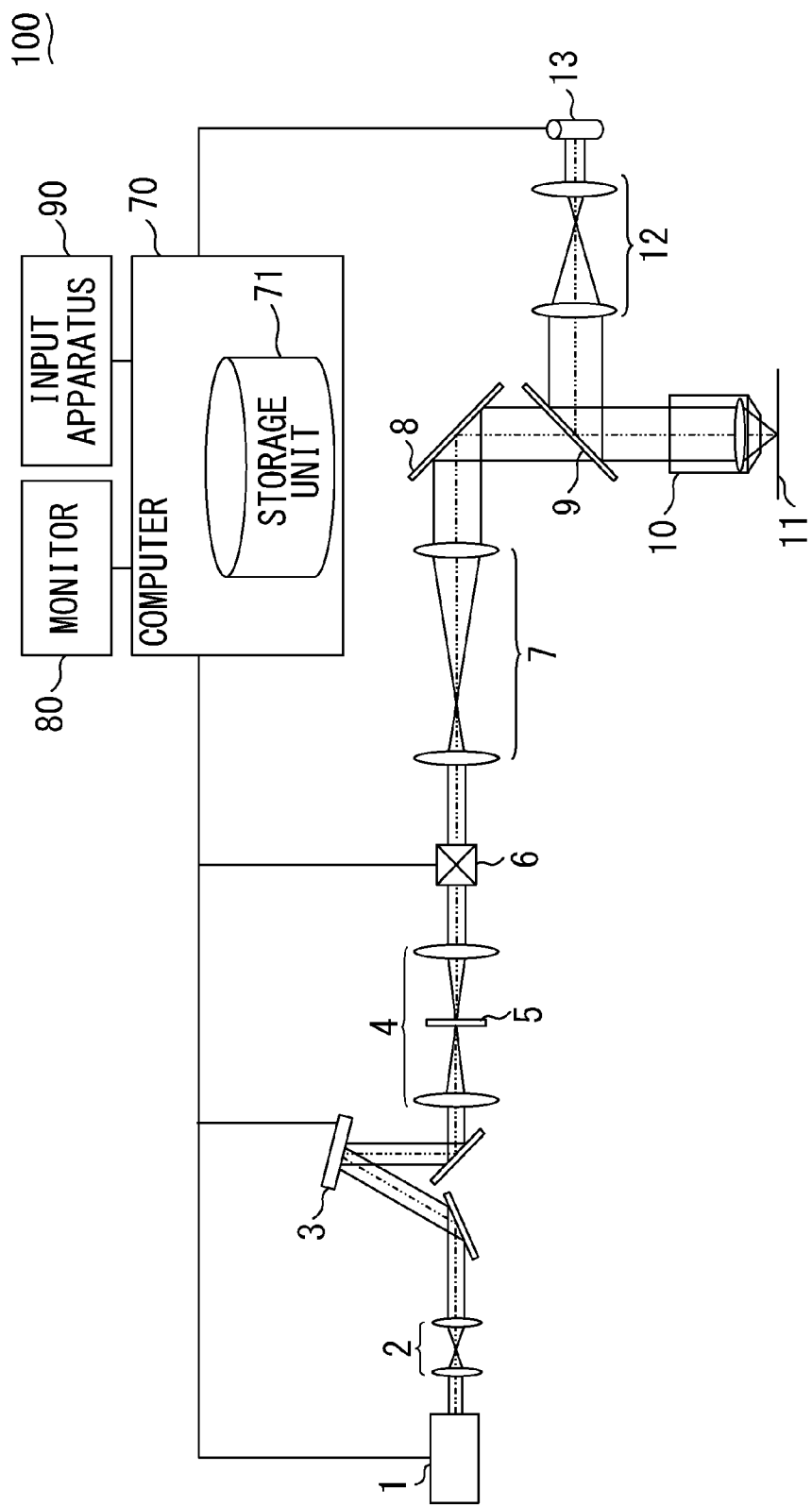
F I G. 1

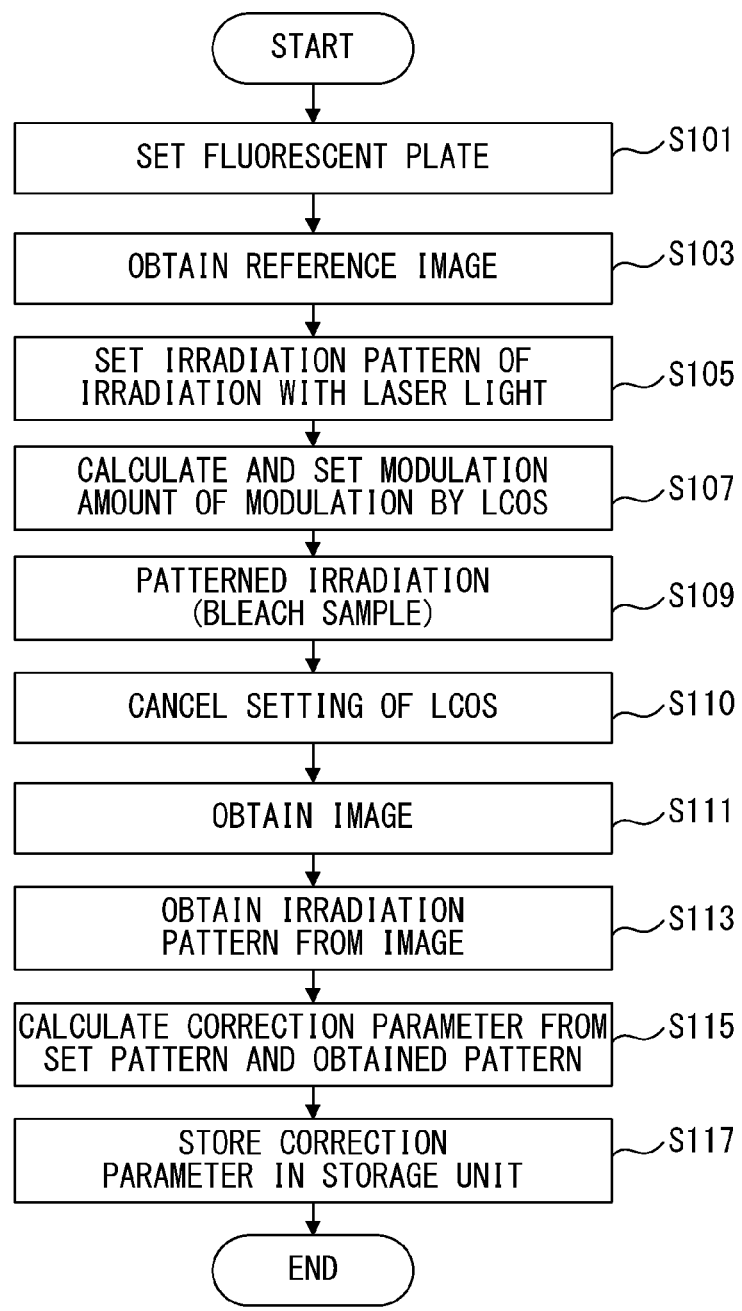
F I G. 2

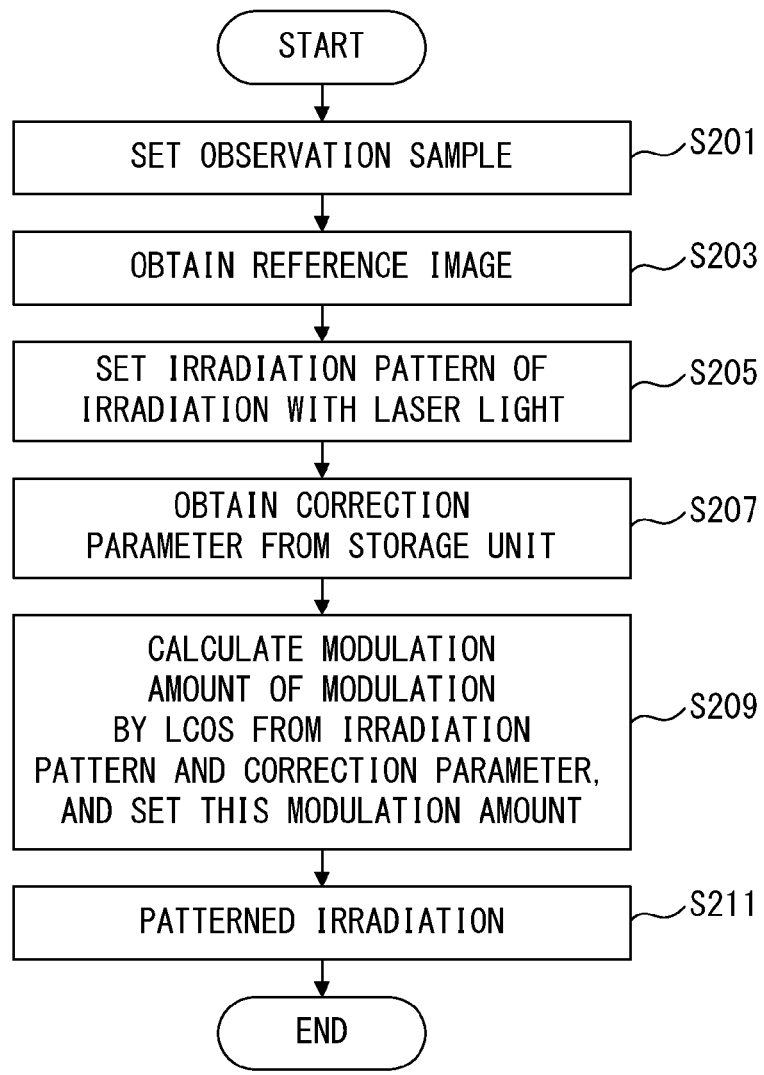
F I G. 6

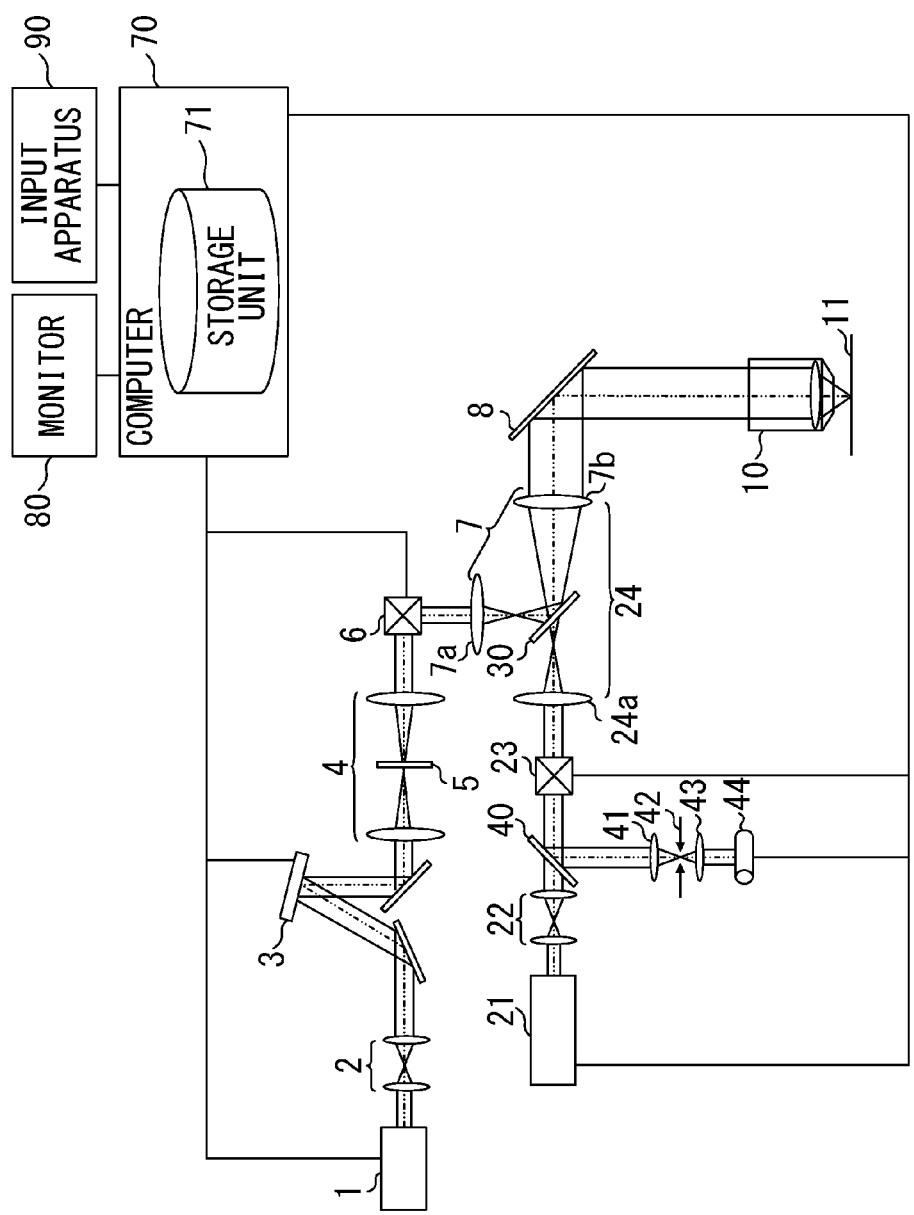
F I G. 10

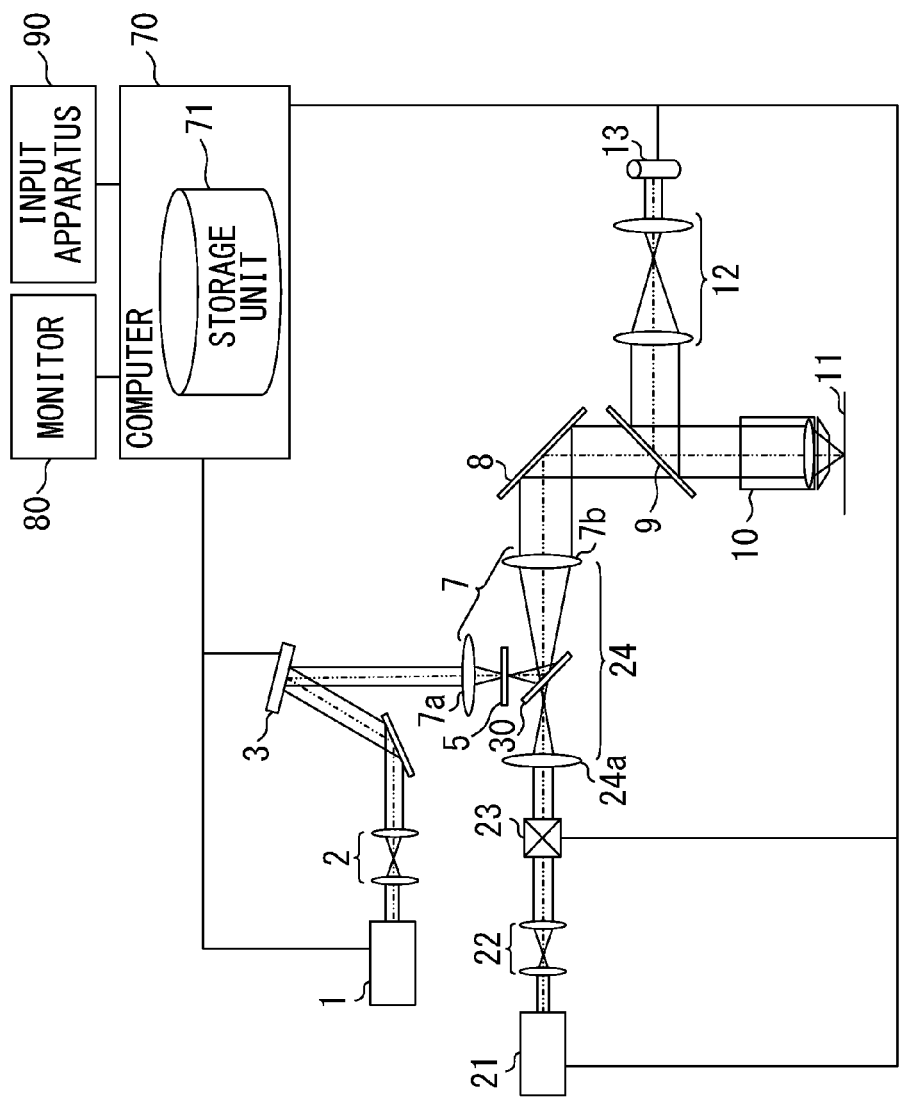
F I G. 1 3

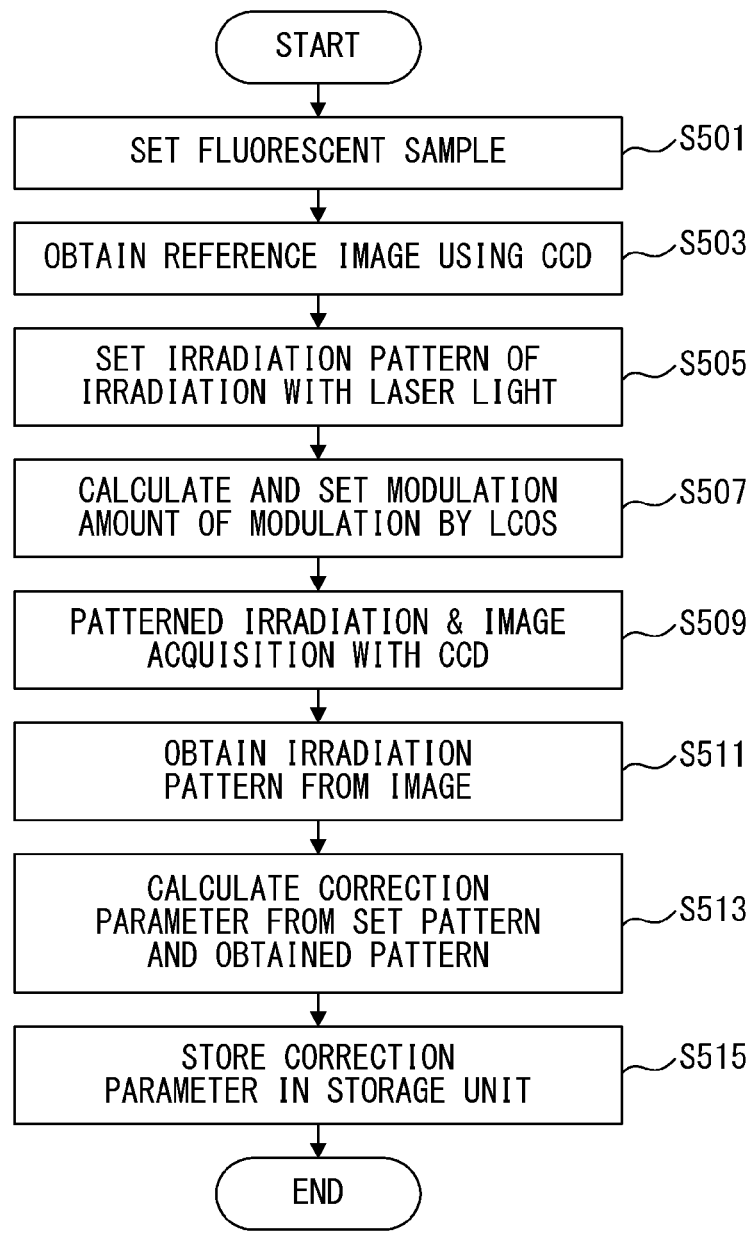
F I G. 15

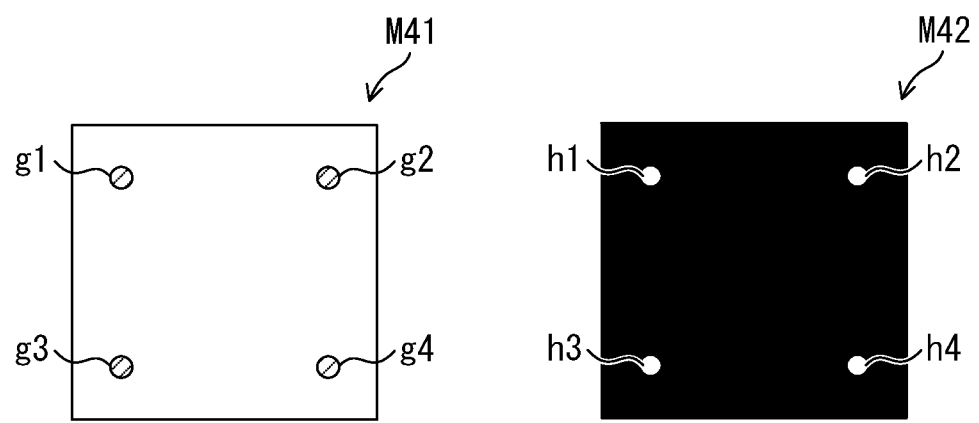
F I G. 1 6 A   F I G. 1 6 B

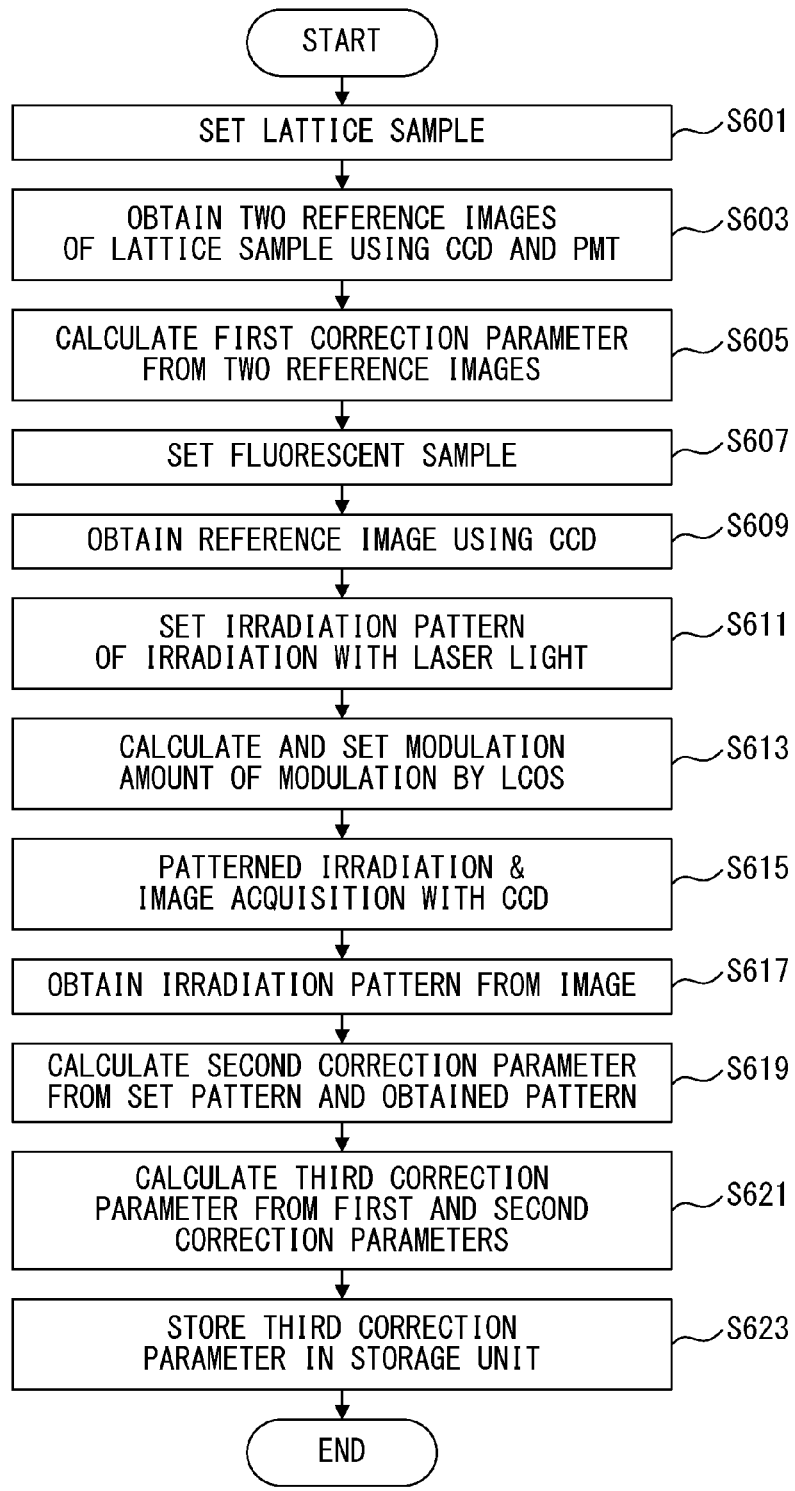
F I G. 1 7

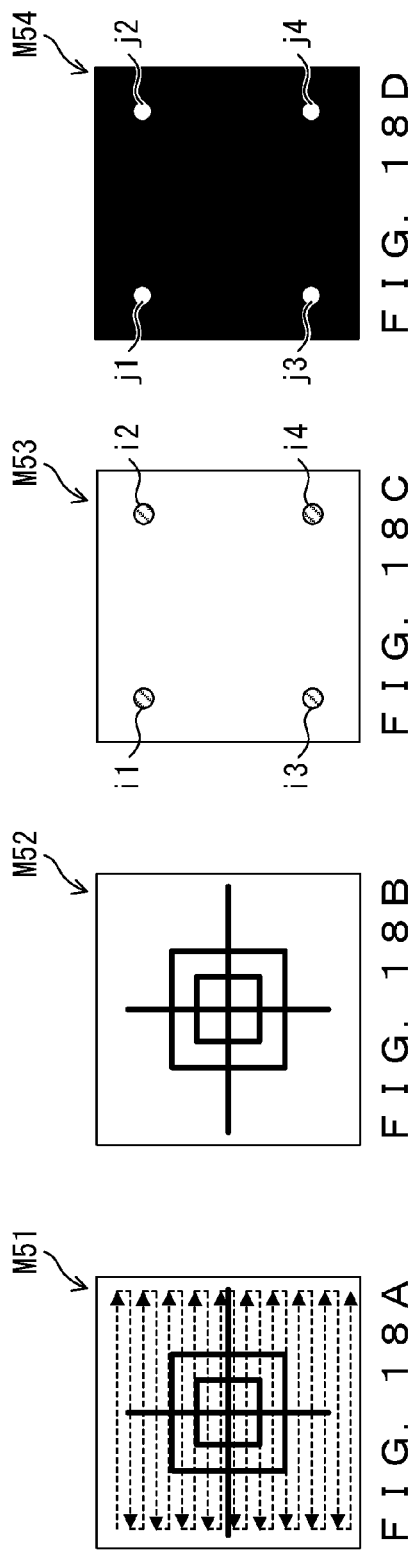

OPTICAL APPARATUS

CROSS REFERENCE TO RELATED APPLICATIONS

This application is based upon and claims the benefit of priority from prior Japanese Patent Application No. 2012-265902, filed Dec. 5, 2012, the entire contents of which are incorporated herein by this reference.

BACKGROUND OF THE INVENTION

Field of the Invention

The present invention relates to an optical apparatus and particularly to an optical apparatus provided with a calibration function to correct a light pattern formed on a sample.

Description of the Related Art

Conventionally, microscopes have been known that perform patterned irradiation with light by using a spatial light modulator (SLM).

The spatial light modulators used for patterned irradiation are roughly classified into: phase-modulation spatial light modulators located at a position optically conjugate to the pupil position of an objective; and intensity-modulation spatial light modulators located at a position optically conjugate to the focal position of an objective.

For example, LCOS (liquid crystal on silicon) is known as a phase-modulation spatial light modulator. Japanese Laid-open Patent Publication No. 2011-099986 discloses a microscope that includes: means for performing patterned irradiation with stimulation light by using a phase-modulation spatial light modulator composed of LCOS; and means for causing scan means to scan a sample with light so as to obtain the image of the sample.

Meanwhile, a DMD® (Digital Micromirror Device) is known as an intensity-modulation spatial light modulator.

In general, to perform patterned irradiation with light using a microscope, a pattern shape to be formed on a sample or a position to be irradiated is designated on a screen displaying the image of the sample. In fact, however, patterned irradiation often fails to follow, for example, the position or the shape designated on the screen due to an error caused by the optical system. Thus, a technology is demanded for calibrating microscopes and optical systems provided with a microscope so as to perform patterned irradiation in accordance with designation on a screen.

SUMMARY OF THE INVENTION

An aspect of the present invention provides an optical apparatus that includes: a laser light source; an objective that irradiates a sample with laser light from the laser light source; a phase-modulation spatial light modulator that is located at a position optically conjugate to a pupil position of the objective and that modulates a phase of the laser light; a scan unit that scans the sample with the laser light so as to generate an image of the sample; a detector that detects observation light from the sample; an image generating unit that generates an image of the sample according to a signal from the detector and control information of the scan unit; and a controlling unit that sets, for the phase-modulation spatial light modulator, a modulation amount of the phase of the laser light in accordance with a pattern to be formed on the sample using the laser light, wherein according to the pattern to be formed on the sample and a pattern of irradiation with the laser light obtained from the image generated by the image generating unit, the controlling unit corrects the modulation amount that is set for the phase-modulation spatial light modulator.

BRIEF DESCRIPTION OF THE DRAWINGS

The present invention will be more apparent from the following detailed description when the accompanying drawings are referenced.

FIG. 1 illustrates a configuration of an optical apparatus in accordance with embodiment 1 of the present invention.

FIG. 2 illustrates a flowchart of a calibration process performed by the optical apparatus of FIG. 1.

FIG. 6 illustrates a flowchart of a patterned irradiation process performed by the optical apparatus of FIG. 1.

FIG. 10 illustrates a configuration of an optical apparatus in accordance with embodiment 3 of the present invention.

FIG. 13 illustrates a configuration of an optical apparatus in accordance with embodiment 4 of the present invention.

FIG. 15 illustrates a flowchart of a calibration process performed by the optical apparatus of FIG. 14.

FIG. 16A illustrates the calibration process performed by the optical apparatus of FIG. 14 and depicts the designating of a pattern.

FIG. 16B illustrates the calibration process performed by the optical apparatus of FIG. 14 and depicts an image displayed on a monitor.

FIG. 17 illustrates a flowchart of another calibration process performed by the optical apparatus of FIG. 14.

FIG. 18A illustrates another calibration process performed by the optical apparatus of FIG. 14 and depicts a reference image according to a signal from a PMT.

FIG. 18B illustrates another calibration process performed by the optical apparatus of FIG. 14 and depicts a reference image according to a signal from a CCD.

FIG. 18C illustrates another calibration process performed by the optical apparatus of FIG. 14 and depicts a pattern designated on an image.

FIG. 18D illustrates another calibration process performed by the optical apparatus of FIG. 14 and depicts a pattern obtained from an image.

DESCRIPTION OF THE EMBODIMENTS

Figure 3C:
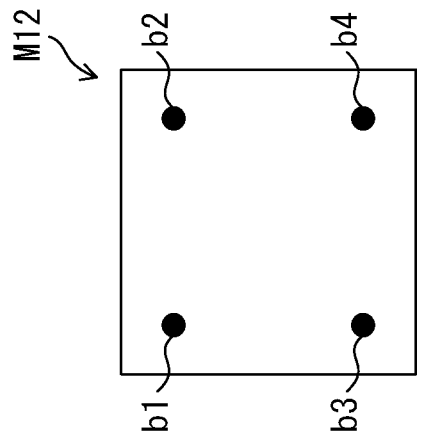
FIG. 3C illustrates the calibration process performed by the optical apparatus of FIG. 1 and depicts an image displayed on a monitor.

In the following, embodiments of the present invention will be described with reference to the drawings.
<Embodiment 1>

FIG. 1 illustrates a configuration of an optical apparatus in accordance with the present embodiment. An optical apparatus 100 illustrated in FIG. 1 includes a patterned-irradiation function for irradiating a sample 11 with light of an optional pattern and a calibration function for calibrating the apparatus by correcting the light pattern. The optical apparatus 100 includes: a microscope; a computer 70 that controls the microscope; and a monitor 80 and an input apparatus 90, both of which are connected to the computer 70.

The microscope of the optical apparatus 100 includes: a laser light source 1; an objective 10; and an LCOS 3, which is a phase-modulation spatial light modulator located at a position optically conjugate to a pupil position of the objective 10. The microscope of the optical apparatus 100 forms an optional laser-light pattern on the sample 11 by modulating the phase of laser light with the LCOS 3.

More particularly, as depicted in FIG. 1, the microscope includes: the laser light source 1; a beam expander 2; the LCOS 3; a relay lens 4; a 0th-order-light cut filter 5; a galvanometer mirror 6; a relay lens 7; a mirror 8; a dichroic mirror 9; the objective 10; a relay lens 12; and a photomultiplier tube (PMT) 13. Both the LCOS 3 and the galvanometer mirror 6 are located at a position optically conjugate to a pupil position of the objective 10. The PMT 13 is also located at a position optically conjugate to the pupil position of the objective 10.

The computer 70 includes a storage unit 71 composed of, for example, a hard disk or a memory, and the computer 70 is connected to at least the laser light source 1, the LCOS 3, the galvanometer mirror 6, and the PMT 13 from among the elements of the microscope. The computer 70 is configured to control these elements and to receive and process a signal from these elements.

In the optical apparatus 100 with the aforementioned configuration, the beam expander 2 adjusts the light flux diameter of the laser light emitted from the laser light source 1, and the laser light is then incident on the LCOS 3. The LCOS 3 includes a plurality of two-dimensionally arranged pixel elements each of which is independently controlled. The phase of laser light incident on a pixel element of the LCOS 3 is modulated by this pixel element. The phase modulation on the LCOS 3 is achieved by inputting a pattern to be formed on the sample 11 into the computer 70 using the input apparatus 90 and by the computer 70 setting the modulation amount of the phase of laser light for the LCOS 3 (for each pixel element, more particularly) in accordance with the inputted pattern. Then, the laser light is incident on the mirror 8 via the relay lens 4, the galvanometer mirror 6, and the relay lens 7, but 0th-order diffracted light generated by the LCOS 3 is cut by the 0th-order-light cut filter 5 provided within the relay lens 4. After being reflected by the mirror 8 in an optical-axis direction of the objective 10, the laser light passes through the dichroic mirror 9, which allows passage of laser light and reflects fluorescence, and the laser light is then incident on the objective 10. Subsequently, the objective 10 irradiates the sample 11 with the laser light, thereby forming on the sample 11 a laser-light pattern that depends on the phase modulation by the LCOS 3.

To generate an image of the sample 11, the 0th-order-light cut filter 5 is removed from the light path of the optical apparatus 100, and the sample 11 is irradiated with laser light without the phase of the laser light being modulated by the LCOS 3. Then, the galvanometer mirror 6 positioned between the objective 10 and the LCOS 3 scans the sample 11 with laser light in an XY direction orthogonal to an optical axis of the objective 10. Fluorescence generated from the sample 11 via irradiation with laser light is incident on the dichroic mirror 9 via the objective 10, is reflected from the dichroic mirror 9, and is then incident on the PMT 13 via the relay lens 12. The PMT 13, which has detected the fluorescence, transmits an electric signal to the computer 70. The computer 70 receives the electric signal from the PMT 13 and generates an image of the sample 11 from the received electric signal and the control information of the galvanometer mirror 6 that indicates a scan position. That is, in the optical apparatus 100, the galvanometer mirror 6 is a scan unit that scans the sample 11 with laser light in order to generate an image of the sample 11, and the PMT 13 is a detector that detects florescence, i.e., observation light from the sample 11. During patterned irradiation, the computer 70 functions as a control unit that sets for the LCOS 3 a modulation amount of the phase of laser light in accordance with a pattern to be formed on the sample 11 with the laser light. During image generation, the computer 70 also functions as an image generating unit that generates an image of the sample 11 according to a signal from the PMT 13 and the control information of the galvanometer mirror 6.

Figure 3B:
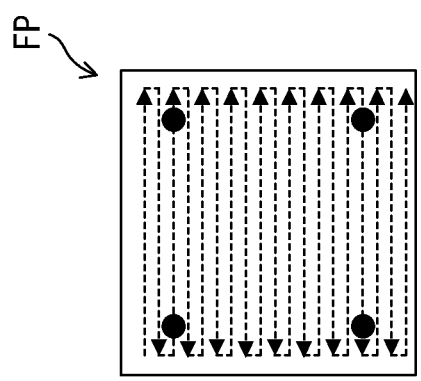
FIG. 3B illustrates the calibration process performed by the optical apparatus of FIG. 1 and depicts the scanning of a fluorescent plate with laser light.
Figure 3A:
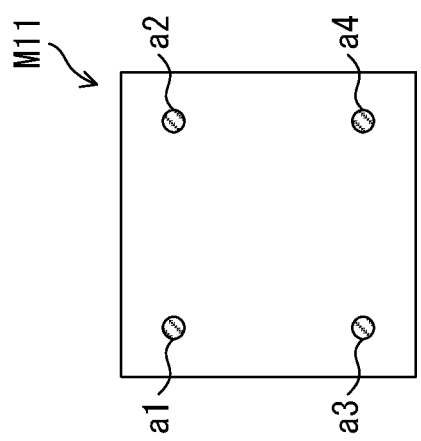
FIG. 3A illustrates a calibration process performed by the optical apparatus of FIG. 1 and depicts the designating of a pattern.

FIG. 2 illustrates a flowchart of a calibration process performed by the optical apparatus of FIG. 1. FIG. 3A to FIG. 3C illustrate a calibration process performed by the optical apparatus of FIG. 1. In the following, with reference to FIG. 2 and FIG. 3A to FIG. 3C, specific descriptions will be given of the calibration process performed by the optical apparatus 100 in accordance with the present embodiment.

Note that the calibration process depicted in FIG. 2 is performed via the computer 70 executing a control program stored in the storage unit 71.

First, a user of the optical apparatus 100 sets on a stage a fluorescent plate FP as the sample 11 (step S101). The fluorescent plate FP, which is a fluorescent sample used to calibrate the optical apparatus 100, is a flat plate to the entirety of which a fluorescent substance is applied.

When the fluorescent plate FP is set, the computer 70 obtains a reference image of the fluorescent plate FP (step S103). In particular, first, the 0th-order-light cut filter 5 is removed from the light path. Then, without the phase being modulated by the LCOS 3, the galvanometer mirror 6 scans the fluorescent plate FP with the laser light from the laser light source 1. In addition, according to a signal from the PMT 13, which has detected fluorescence from the fluorescent plate FP, and the control information of the galvanometer mirror 6, an image M11, a reference image of the fluorescent plate FP, is generated and displayed on the monitor 80. The reference image means an image obtained without the phase being modulated by the LCOS 3.

Subsequently, checking the monitor 80 on which the image M11, i.e., the reference image, is displayed, the user of the optical apparatus 100 designates a pattern to be formed on the fluorescent plate FP by using the input apparatus 90. For example, as illustrated in FIG. 3A, the user designates four points (positions a1 to a4) on the image M11 and designates an irradiation pattern composed of the four points.

The computer 70 reads the pattern designated on the image M11 by the user and sets this pattern as an irradiation pattern of laser light (step S105). In this example, the information of the four points, the positions a1 to a4, is set as the irradiation pattern. Then, the modulation amount of phase modulation to be performed by the LCOS 3 is calculated from the irradiation pattern, and the calculated modulation amount is set for the LCOS 3 (step S107). More particularly, the modulation amount of modulation of phase is calculated and set for each pixel element.

Completing the settings, the computer 70 performs patterned irradiation of the fluorescent plate FP (step S109). In particular, the 0th-order-light cut filter 5 is inserted in the light path, light is emitted from the laser light source 1, and the pattern that depends on the modulation amount set for the LCOS 3 is formed on the fluorescent plate FP. In the patterned irradiation, the fluorescent plate FP is irradiated with a sufficient amount of light so as to bleach the portion of the fluorescent plate FP irradiated with laser light.

When the patterned irradiation ends, the setting of the modulation amount for the LCOS 3 is cancelled (step S110). That is, the setting is changed in a manner such that the LCOS 3 functions as a simple mirror without modulating the phase of laser light.

Subsequently, the computer 70 obtains an image of the fluorescent plate FP again (step S111). In particular, as in the case of step S103, the 0th-order-light cut filter 5 is first removed from the light path. Then, without the phase being modulated by the LCOS 3, as illustrated in FIG. 3B, the galvanometer mirror 6 scans, with the laser light from the laser light source 1, the fluorescent plate FP, which has partly bleached due to patterned irradiation. In addition, according to a signal from the PMT 13, which has detected fluorescence, and the control information of the galvanometer mirror 6, an image M12 of the fluorescent plate FP is generated and displayed on the monitor 80. FIG. 3C illustrates the image M12 displayed on the monitor 80 and depicts the four points (positions b1 to b4), i.e., portions bleached due to patterned irradiation.

The computer 70 obtains an irradiation pattern from the image M12 (step S113). That is, the irradiation pattern of irradiation with the laser light with which the fluorescent plate FP has actually been irradiated is obtained from the image M12 of the fluorescent plate FP that has bleached due to the irradiation with laser light. In particular, the information of the positions b1 to b4 is obtained.

Figure 4A:
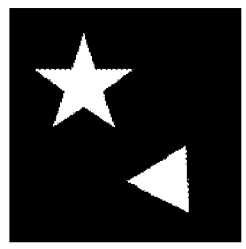
FIG. 4A illustrates projective transformation and depicts a situation before projective transformation.
Figure 4B:
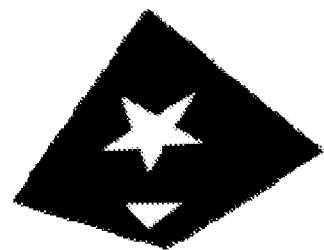
FIG. 4B illustrates projective transformation and depicts a situation after projective transformation.

The computer 70 calculates a correction parameter from the pattern set in step S105 and the pattern obtained in step S113 (step S115). Note that the correction parameter is used to calculate a pattern to be designated to form a desired pattern on the fluorescent plate FP in consideration of the fact that there is a gap between a pattern to be formed on the fluorescent plate FP (i.e., a pattern that has been set) and a pattern of irradiation with laser light. More particularly, the correction parameter is a coefficient of coordinate transformation to transform coordinates indicative of a desired pattern into coordinates indicative of a pattern to be designated. In this example, the information of the four sets (i.e., a set of positions a1 and b1, a set of positions a2 and b2, a set of positions a3 and b3, and positions a4 and b4) is obtained so that a coefficient of projective transformation can be calculated as the correction parameter from the information of these four sets. FIG. 4A to FIG. 4B respectively illustrate images before and after projective transformation. Projective transformation may correct translation, scaling, rotation, shear, and trapezium distortion of a pattern.

Figure 5A:
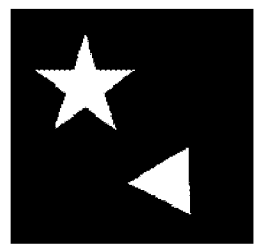
FIG. 5A illustrates affine transformation and depicts a situation before affine transformation.
Figure 5B:
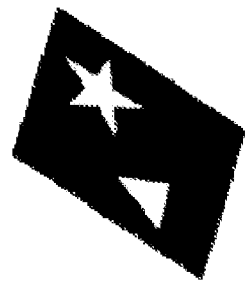
FIG. 5B illustrates affine transformation and depicts a situation after affine transformation.

When the information of three sets is obtained, a coefficient of affine transformation may be calculated as the correction parameter. FIG. 5A and FIG. 5B respectively illustrate images before and after affine transformation. Affine transformation may correct translation, scaling, rotation, and shear of a pattern. When the information of two sets is obtained, a coefficient of coordinate transformation to correct translation, scaling, and rotation of a pattern may be calculated as the correction parameter. When the information of one set is obtained, a coefficient of coordinate transformation to correct translation of a pattern may be calculated as the correction parameter. When the information of five or more sets is obtained, affine transformation or projective transformation may be applied using a least square method, or the correction parameter may be calculated using another arbitrary technique. Accordingly, obtaining the information of a larger number of sets leads to more advanced coordinate transformation so that the pattern can be more precisely corrected, and hence it is desirable to obtain the information of at least three sets.

Finally, the computer 70 stores the calculated correction parameter in the storage unit 71 (step S117) and ends the calibration process. The correction parameter is desirably stored in association with various conditions of patterned irradiation. In particular, in association with, for example, the wavelength of laser light, the objective, or an irradiation range for a pattern to be formed on the sample, the correction parameter is desirably stored for each of these pieces of information (the wavelength, the objective, and the irradiation range). This is because a different wavelength of laser light or a different objective differently affects laser light in the optical apparatus 100 and, consequently, a gap in, for example, the position or shape of patterned irradiation also becomes different. Another reason is that the correction precision of the entire irradiation range may possibly change with the size of the irradiation range.

FIG. 6 illustrates a flowchart of a patterned irradiation process performed by the optical apparatus of FIG. 1. In the following, with reference to FIG. 6, specific descriptions will be given of a patterned irradiation process performed after calibration by the optical apparatus 100 in accordance with the present embodiment. The patterned irradiation process depicted in FIG. 6 is also performed via the computer 70 executing a control program stored in the storage unit 71.

First, a user of the optical apparatus 100 sets on a stage the fluorescent sample FS as the sample 11 (step S201). The fluorescent sample FS is an observation object to which pattered irradiation is applied and is not the fluorescent plate FP.

When the fluorescent sample FS is set, the computer 70 obtains a reference image of the fluorescent sample FS using a method similar to that in step S103 (step S203) and displays the obtained image on the monitor 80.

Subsequently, checking the monitor 80, the user of the optical apparatus 100 designates a pattern to be formed on the fluorescent sample FS by using the input apparatus 90. For simplicity of description, the following descriptions are based on an exemplary situation in which the same pattern as that designated in the calibration process depicted in FIG. 2 is designated. The designated pattern is not limited to the pattern designated in the calibration process depicted in FIG. 2, and any irradiation pattern may be designated.

The computer 70 reads the pattern designated by the user and sets this pattern as an irradiation pattern of laser light (step S205). That is, the information of the four points, positions a1 to a4, is set as the irradiation pattern.

Next, the computer 70 obtains a correction parameter from the storage unit 71 (step S207). When a correction parameter is stored for each wavelength of laser light or for each objective, a correction parameter stored in association with the wavelength of laser light or an objective used for patterned irradiation is obtained. When a correction parameter is stored for each irradiation range, a correction parameter stored in association with an irradiation range that is the most similar to the pattern set in step S205 is obtained.

Then, the computer 70 calculates the modulation amount of phase to be performed by the LCOS 3 from the irradiation pattern set in step S205 and the correction parameter obtained in step S207, and sets this calculated modulation amount (step S209). More particularly, the coordinates of the irradiation pattern set in step S205 are transformed using a correction parameter that is a coefficient of coordinate transformation, and an irradiation pattern is calculated that needs to be set to obtain the irradiation pattern that has been set. Then, the modulation amount of phase to be set is calculated for each pixel element from the calculated irradiation pattern and is set for each pixel element.

Finally, the computer 70 inserts the 0th-order-light cut filter 5 into the light path and causes the laser light source 1 to emit light so as to apply patterned irradiation to the fluorescent sample FS (step S211).

As described above, the computer 70 of the optical apparatus 100 uses a correction parameter to correct an irradiation pattern that has been set and calculates the modulation amount of phase from the corrected irradiation pattern. In other words, according to the pattern to be formed on a sample and the pattern of irradiation with laser light obtained from a generated image, the computer 70 corrects the modulation amount that is set for the LCOS 3. Hence, an irradiation pattern set for the sample may be formed. Accordingly, the optical apparatus 100 first performs the calibration process illustrated in FIG. 2 and then performs the patterned irradiation process illustrated in FIG. 3A so that patterned irradiation can be performed in conformity with, for example, a desired position or shape. Particularly in the present embodiment, since only one illumination light path is used to perform patterned irradiation, the calibration process can be achieved with a simple configuration. In addition, the calibration process illustrated in FIG. 2 allows the information required to calculate a correction parameter to be obtained in one operation by irradiating many points, and hence the optical apparatus 100 may easily calculate a correction parameter to which advanced coordinate transformation is applicable.

Descriptions have been given of the example in which the fluorescent plate FP is used in the calibration process, but samples used in the calibration process are not limited to the fluorescent plate FP. Any fluorescent sample may be used instead of the fluorescent plate FP, as long as the portion of the sample irradiated with laser light in patterned irradiation is caused to bleach.

The aforementioned configuration is based on the assumption that the detector detects the fluorescence due to two-photon excitation phenomenon, but the fluorescence detected by the detector is not limited to that generated with two-photon excitation phenomenon. A detector may be located at a position passing through a descan mechanism and a confocal diaphragm in order to detect the fluorescence due to one-photon excitation.

Figure 7:
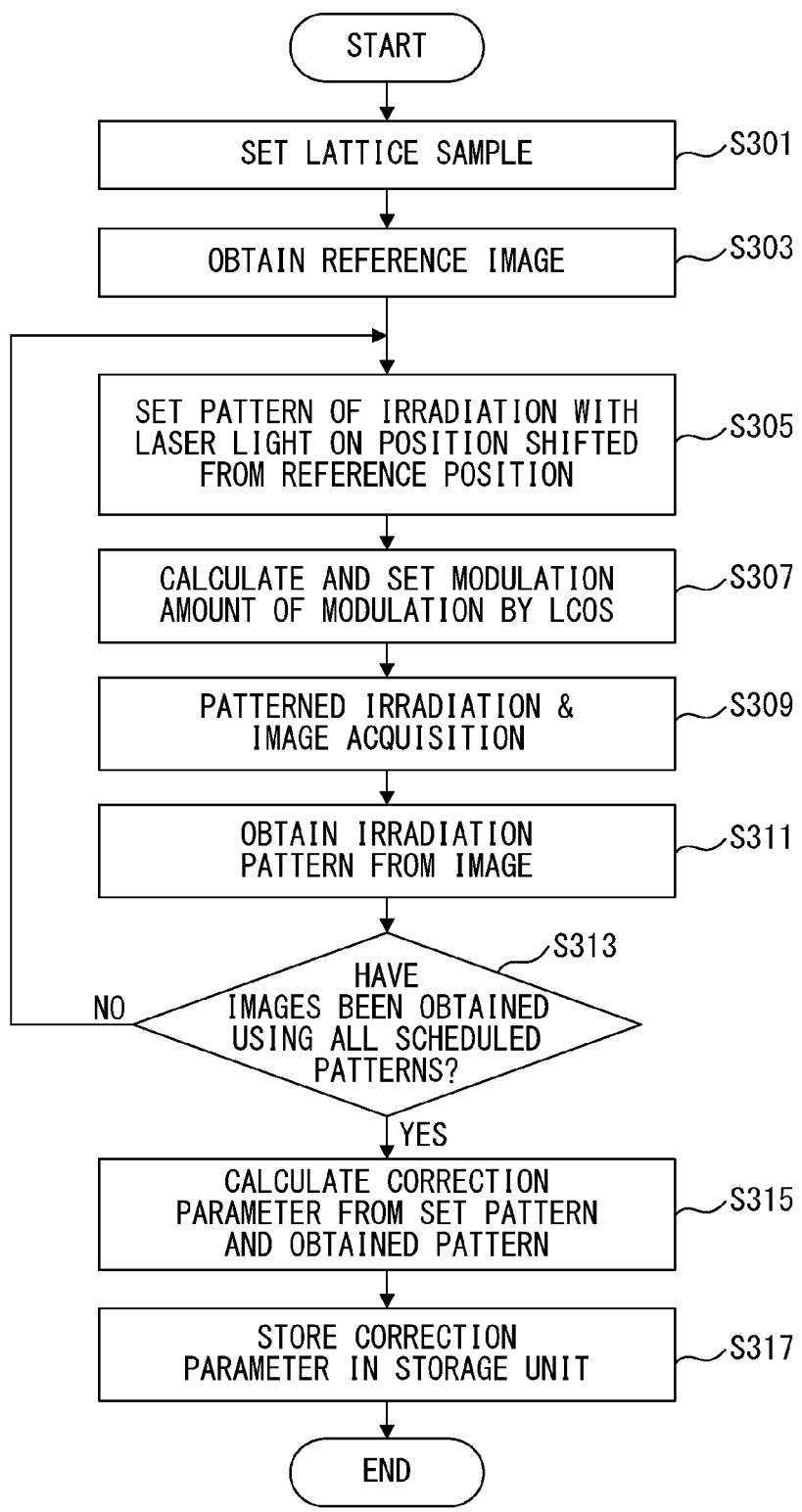
FIG. 7 illustrates a flowchart of another calibration process performed by the optical apparatus of FIG. 1.

The optical apparatus 100 may be calibrated by performing another calibration process instead of the calibration process illustrated in FIG. 2. FIG. 7 illustrates a flowchart of another calibration process performed by the optical apparatus of FIG. 1. FIG. 8A to FIG. 8F illustrate another calibration process performed by the optical apparatus of FIG. 1. In the following, with reference to FIG. 7 and FIG. 8A to FIG. 8F, specific descriptions will be given of other calibration processes performed by the optical apparatus 100 in accordance with the present embodiment. Note that the calibration process illustrated in FIG. 7 is performed via the computer 70 executing a control program stored in the storage unit 71.

Figure 8A:
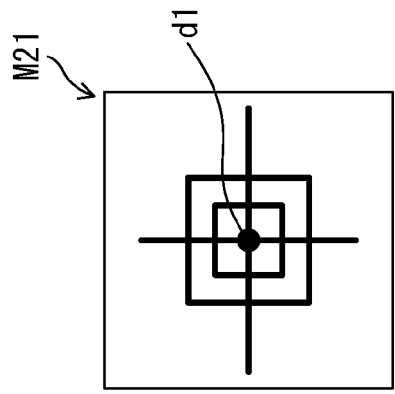
FIG. 8A illustrates another calibration process performed by the optical apparatus of FIG. 1 and depicts making the center of a lattice chart coincide with a reference position.

First, a user of the optical apparatus 100 sets on a stage a lattice sample LS as the sample 11 (step S301). As illustrated in FIG. 8A, the lattice sample LS is a sample with a lattice chart drawn on the sample surface that is used to calibrate the optical apparatus 100. The lattice sample LS is set so that the center of the lattice chart coincides with a position c1, a reference position.

Figure 8C:
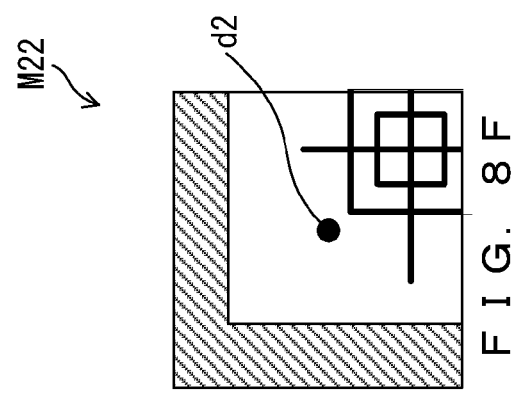
FIG. 8C illustrates another calibration process performed by the optical apparatus of FIG. 1 and depicts a reference image displayed on a monitor.
Figure 8B:
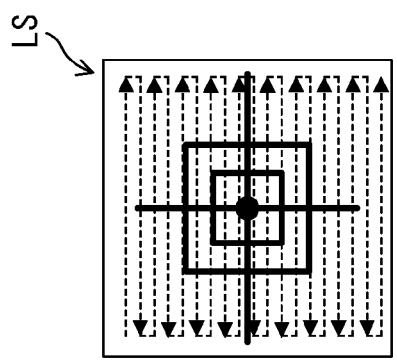
FIG. 8B illustrates another calibration process performed by the optical apparatus of FIG. 1 and depicts the scanning of a lattice sample with laser light.

When the lattice sample LS is set, the computer 70 obtains a reference image of the lattice sample LS (step S303). In particular, first, the 0th-order-light cut filter 5 is removed from the light path. Then, without the phase being modulated by the LCOS 3, the galvanometer mirror 6 scans the lattice sample LS with the laser light from the laser light source 1, as illustrated in FIG. 8B. In addition, according to a signal from the PMT 13 and the control information of the galvanometer mirror 6, an image M21, a reference image of the lattice sample LS, is generated and displayed on the monitor 80. FIG. 8C illustrates the image M21 displayed on the monitor 80. For simplicity, the following descriptions will be based on an exemplary situation in which the center of the lattice chart in the image M21 coincides with a position d1 that is the center of the image M21 and that corresponds to the reference position c1.

When a reference image is obtained, the computer 70 sets a pattern of irradiation with laser light on a position shifted from the reference position c1 on the lattice sample LS (step S305). In particular, as illustrated in, for example, FIG. 8D, one point at a position c2 to the left of and above the center of the lattice chart in the lattice sample LS is set as a pattern of irradiation with laser light. That is, the position c2 indicates a pattern to be formed on the lattice sample LS when the galvanometer mirror 6 is located at a predetermined position. Then, the modulation amount of phase by the LCOS 3 is calculated from the irradiation pattern of the position c2 and is set for the LCOS 3 (step S307).

Figure 8E:
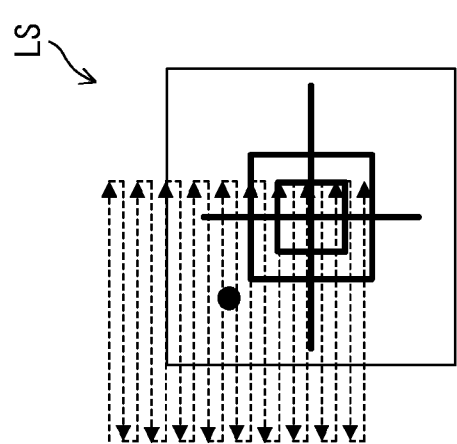
FIG. 8E illustrates another calibration process performed by the optical apparatus of FIG. 1 and depicts the scanning of the lattice sample with laser light while applying patterned irradiation to a lattice sample via phase modulation.
Figure 8D:
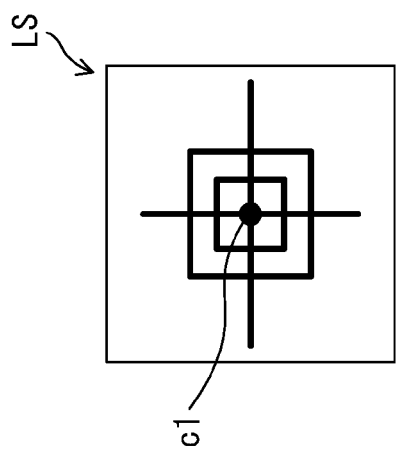
FIG. 8D illustrates another calibration process performed by the optical apparatus of FIG. 1 and depicts setting as an irradiation pattern a position shifted from the center of the lattice chart.
Figure 8F:
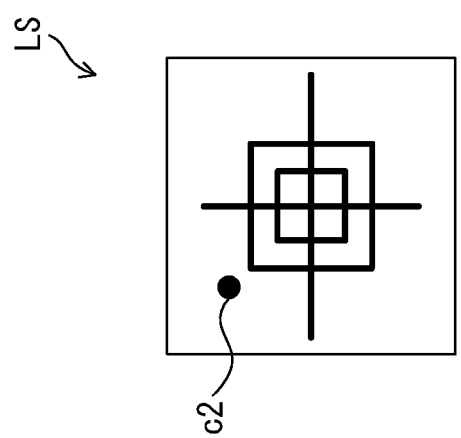
FIG. 8F illustrates another calibration process performed by the optical apparatus of FIG. 1 and depicts an image displayed on a monitor.

When the settings are completed, the computer 70 inserts the 0th-order-light cut filter 5 in the light path and then causes the laser light source 1 to emit light. Subsequently, as illustrated in FIG. 8E, the lattice sample LS is scanned by the galvanometer mirror 6 with laser light while patterned irradiation is being applied to the lattice sample LS via phase modulation by the LCOS 3. In addition, an image M22 of the lattice sample LS is generated according to a signal from the PMT 13 and the control information of the galvanometer mirror 6 and is displayed on the monitor 80 (step S309). FIG. 8F depicts the image M22 displayed on the monitor 80, and a position d2 indicates the center of the image M22.

Next, the computer 70 obtains from the image M22 an irradiation pattern of actual irradiation with laser light (step S311). In this example, the position d2, i.e., the center of the image M22, is obtained as a pattern of actual irradiation with laser light.

Subsequently, the computer 70 determines whether or not images have been obtained for all scheduled irradiation patterns (step S313). When the irradiation pattern of a position to the right of and above the center of the lattice chart, the irradiation pattern of a position to the right of and below the center of the lattice chart, and the irradiation pattern of a position to the left of and below the center of the lattice chart are also scheduled in addition to the irradiation pattern of a position to the left of and above the center of the lattice chart, then the process returns to step S305, and the processes of steps S305 to S311 are repeated for each irradiation pattern. Accordingly, positions c3, c4, and c5 (not illustrated) are obtained as patterns to be formed on the sample (the patterns that have been set (i.e., points, in this example)), and positions d3, d4, and d5 (not illustrated) are obtained as patterns of irradiation with laser light calculated from the image (the patterns that have been obtained (i.e., points, in this example)).

Determining that images have been obtained for all of the irradiation patterns, the computer 70 calculates, according to the lattice chart of the lattice sample, a correction parameter from the patterns that have been set and the patterns that have been obtained (step S315). In this example, the information of four sets (the positions c2 and d2, the positions c3 and d3, the positions c4 and d4, and the positions c5 and d5) has been obtained, and hence, as in the case of step 115 in FIG. 2, the coefficient of projective transformation is calculated from the information of the four sets as the correction parameter.

Finally, the computer 70 stores the calculated correction parameter in the storage unit 71 (step S317) and ends the calibration process. As in the case of the calibration process illustrated in FIG. 2, the correction parameter is desirably stored in association with various conditions of patterned irradiation.

As with the calibration process illustrated in FIG. 2, the calibration process illustrated in FIG. 7 allows the optical apparatus 100 to be calibrated to form a desired irradiation pattern on a sample.

Descriptions have been given of the calibration process illustrated in FIG. 7 on the assumption that the lattice sample LS is a fluorescent sample that includes a black portion from which fluorescence is not emitted and the remaining white portion from which fluorescence is emitted; however, the sample in the calibration process illustrated in FIG. 7 is not limited to a fluorescent sample, but any sample may be used. For example, replacing the dichroic mirror 9 with a half mirror allows the calibration process illustrated in FIG. 7 to be performed using a mirror as a sample. That is, bleaching does not need to occur in the present embodiment, and hence a calibration process may be achieved with a high degree of freedom of sample selection.

<Embodiment 2>

Figure 9:
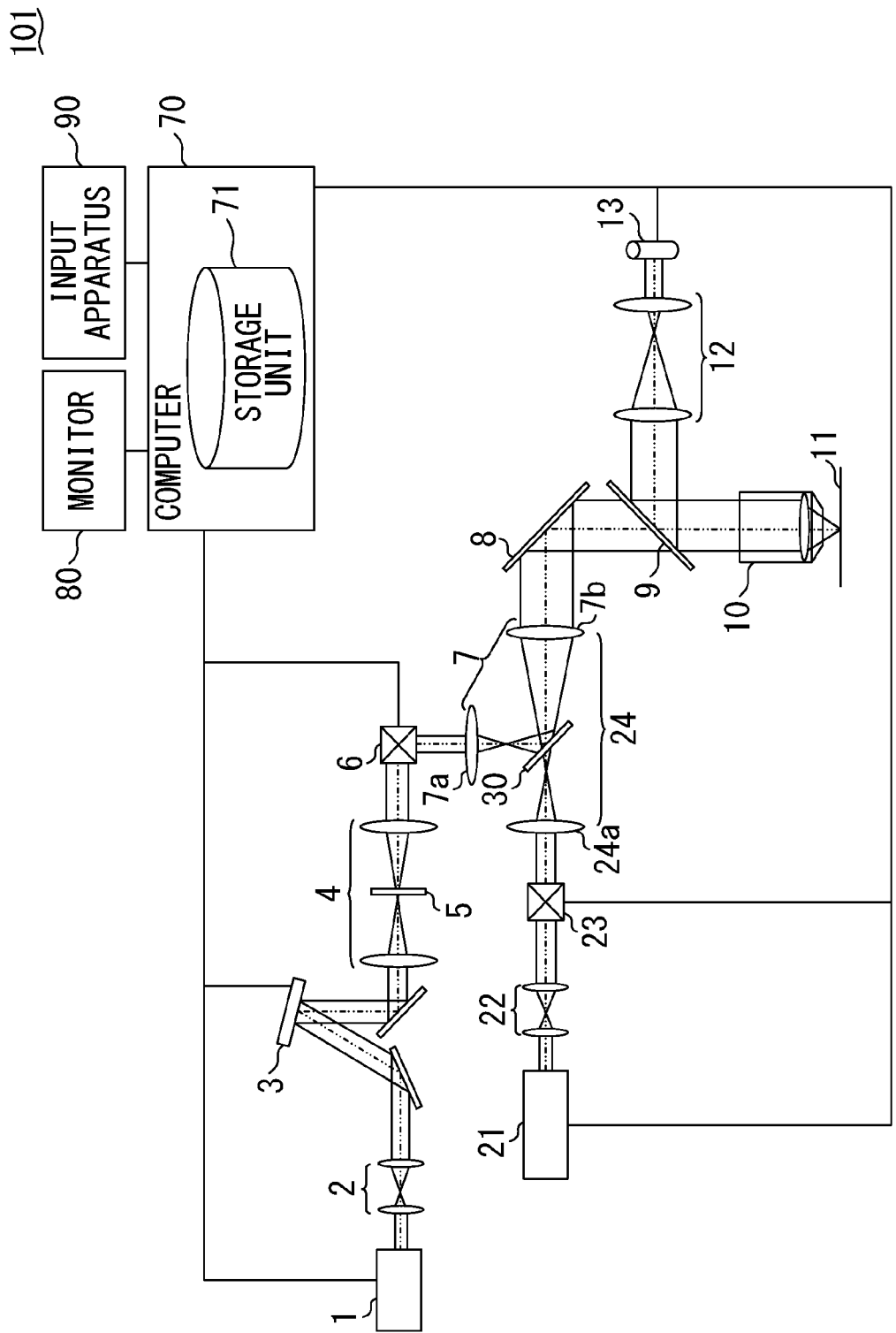
FIG. 9 illustrates a configuration of an optical apparatus in accordance with embodiment 2 of the present invention.

FIG. 9 illustrates a configuration of an optical apparatus in accordance with the present embodiment. An optical apparatus 101 depicted in FIG. 9 is different from the optical apparatus 100 in accordance with embodiment 1 depicted in FIG. 1 in the sense that the optical apparatus 101 includes a dichroic mirror 30 between lenses 7a and 7b that form a relay lens 7; the optical apparatus 101 includes, as illumination means, a laser light source 21, a beam expander 22, a galvanometer mirror 23, and a relay lens 24; and the computer 70 is also connected to the laser light source 21 and the galvanometer mirror 23. The relay lens 24 is composed of lenses 24a and 7b, and the lens 7b is shared by the relay lenses 7 and 24. In the other respects, the optical apparatus 101 is configured similarly to the optical apparatus 100.

The optical apparatus 101 is a microscope that uses, as stimulation light, laser light emitted from the laser light source 1 whose phase is modulated by the LCOS 3, and that uses laser light emitted from the laser light source 21 as illumination light (excitation light). The optical apparatus 101 is different from the optical apparatus 100 in the sense that the optical apparatus 101 includes stimulation means and illumination means separated from each other.

As with the optical apparatus 100 in accordance with embodiment 1, the optical apparatus 101 may perform desired patterned irradiation by performing the patterned irradiation process illustrated in FIG. 3A after performing the calibration process illustrated in FIG. 2 or FIG. 7.

However, in the calibration process of FIG. 2 performed by the optical apparatus 101, a sample is scanned with laser light from the laser light source 21 so as to obtain a reference image, patterned irradiation is applied to the sample with laser light from the laser light source 1 so as to cause the sample to bleach, and the sample is scanned with laser light from the laser light source 21 so as to obtain an image after the patterned irradiation. Accordingly, the optical apparatus 101 is different from the optical apparatus 100 in the sense that, in order to perform the calibration process illustrated in FIG. 2, the optical apparatus 101 uses different laser light sources, i.e., the laser light sources 1 and 21, respectively directed to patterned irradiation and image acquisition.

The calibration process of FIG. 7 performed by the optical apparatus 101 is similar to the calibration process performed by the optical apparatus 100 in the sense that the optical apparatus 101 uses the laser light source 1 so as to perform patterned irradiation and obtain an image. However, in the patterned irradiation process of FIG. 6 performed after the calibration process, an irradiation pattern is typically set while checking an image obtained by scanning the sample with laser light from the laser light source 21. Thus, for the optical apparatus 101, it is desirable to align in advance an image obtained using the laser light source 1 and an image obtained using the laser light source 21 with each other in addition to performing the calibration process illustrated in FIG. 7.

<Embodiment 3>

FIG. 10 illustrates a configuration of an optical apparatus in accordance with the present embodiment. An optical apparatus 102 illustrated in FIG. 10 is different from the optical apparatus 101 in accordance with embodiment 2 depicted in FIG. 9 in the sense that the optical apparatus 102 includes a dichroic mirror 40 between the beam expander 22 and the galvanometer mirror 23 instead of the dichroic mirror 9 between the mirror 8 and the objective 10; the optical apparatus 102 includes a confocal lens 41, a confocal diaphragm 42, a lens 43, and a PMT 44, which together function as confocal detection means, instead of the relay lens 12 and the PMT 13, i.e., non-focal detection means; and the computer 70 is also connected to the PMT 44. The confocal diaphragm 42, which has a pinhole formed therein, is located at a position optically conjugate to a focal position of the objective 10 (the sample 11), and the confocal diaphragm 42 forms a confocal optical system together with the confocal lens 41. The dichroic mirror 30 is light-path dividing means that forms a laser light path in which the LCOS 3 is located to perform patterned irradiation and an observation light path in which the PMT 44, a detector, is located to detect observation light. The confocal optical system is located between the dichroic mirror 30 and the PMT 44. The other components are similar to those of the optical apparatus 101.

As with the optical apparatus 101 in accordance with embodiment 2, the optical apparatus 102 may perform desired patterned irradiation by performing the patterned irradiation process illustrated in FIG. 3A after performing the calibration process illustrated in FIG. 2 or FIG. 7.

Figure 11:
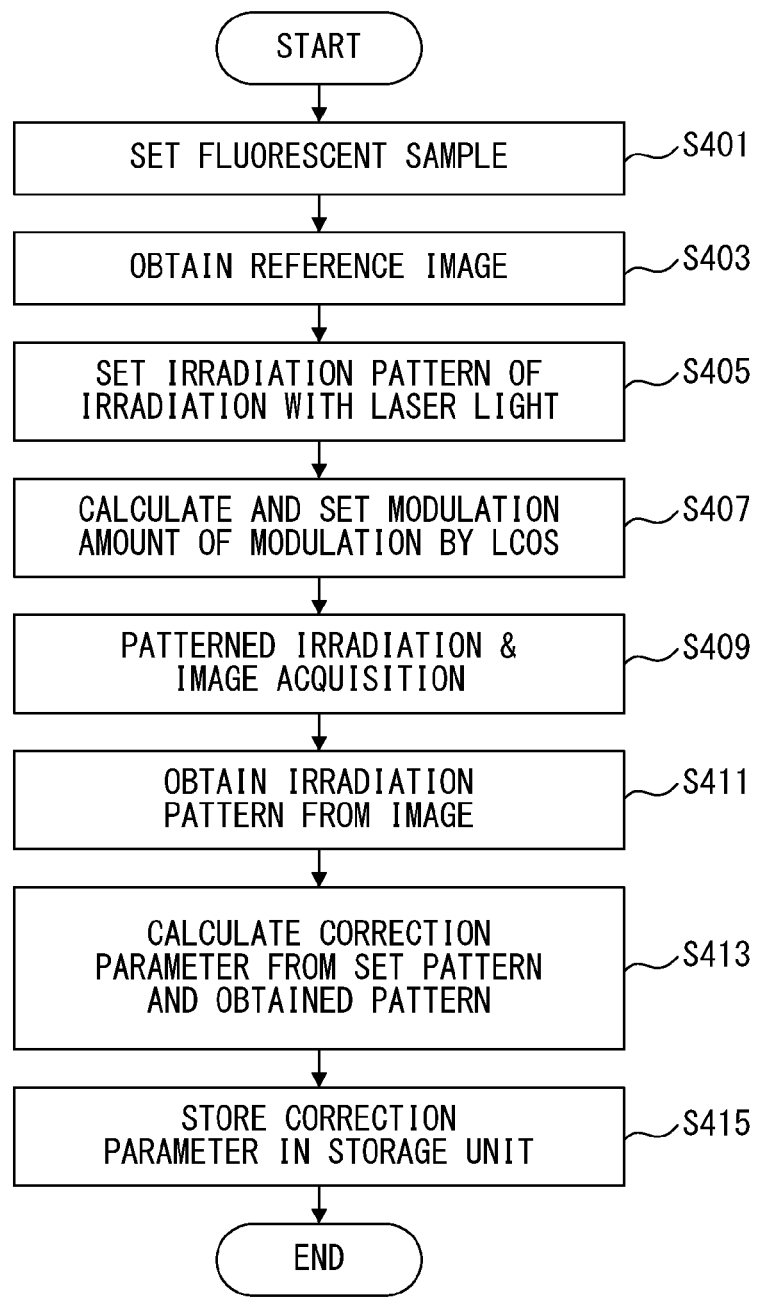
FIG. 11 illustrates a flowchart of a calibration process performed by the optical apparatus of FIG. 10.
Figure 12C:
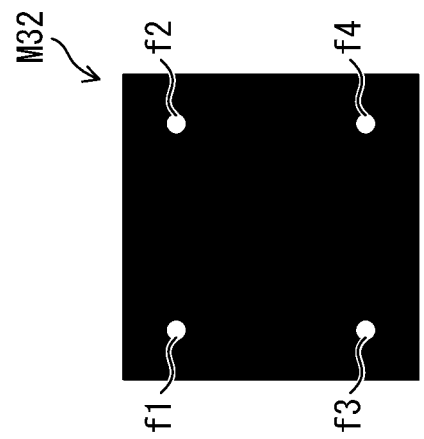
FIG. 12C illustrates the calibration process performed by the optical apparatus of FIG. 10 and depicts an image displayed on a monitor.
Figure 12B:
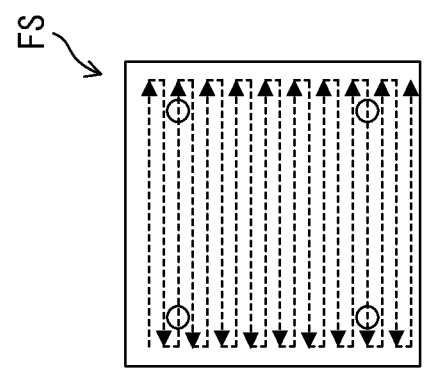
FIG. 12B illustrates the calibration process performed by the optical apparatus of FIG. 10 and depicts the scanning of a fluorescent sample with laser light.
Figure 12A:
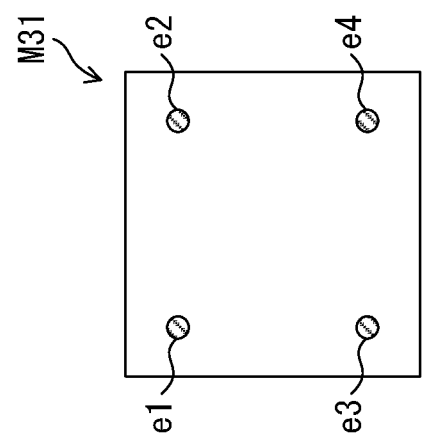
FIG. 12A illustrates a calibration process performed by the optical apparatus of FIG. 10 and depicts the designating of a pattern.

In addition, the optical apparatus 102 may be calibrated by performing another calibration process instead of the calibration process illustrated in FIG. 2 or FIG. 7. FIG. 11 illustrates a flowchart of a calibration process performed by the optical apparatus of FIG. 10. FIG. 12A to FIG. 12C illustrate a calibration process performed by the optical apparatus of FIG. 10. In the following, with reference to FIG. 11 and FIG. 12A to FIG. 12C, specific descriptions will be given of the calibration process performed by the optical apparatus 102 in accordance with the present embodiment. Note that the calibration process depicted in FIG. 11 is performed via the computer 70 executing a control program stored in the storage unit 71.

First, a user of the optical apparatus 102 sets on a stage a fluorescent sample FS as the sample 11 (step S401).

When a fluorescent sample FS is set, the computer 70 obtains a reference image of the fluorescent sample FS (step S403). In particular, the galvanometer mirror 23 scans the fluorescent sample FS with the laser light from the laser light source 21. Then, the PMT 44 detects fluorescence generated from the fluorescent sample FS via irradiation with laser light, and an image M31, a reference image of the fluorescent sample FS, is generated according to a signal from the PMT 44 and control information of the galvanometer mirror 23 and is displayed on the monitor 80.

Subsequently, checking the monitor 80 on which the image M31, i.e., the reference image, is displayed, the user of the optical apparatus 102 designates a pattern to be formed on the fluorescent sample FS by using the input apparatus 90. For example, as illustrated in FIG. 12A, the user designates four points (positions e1 to e4) on the image M31 and designates an irradiation pattern composed of the four points.

The computer 70 reads the pattern designated on the image M31 by the user and sets this pattern as an irradiation pattern of laser light (step S405). In this example, the information of the four points, the positions e1 to e4, is set as the irradiation pattern. Then, the modulation amount of phase to be performed by the LCOS 3 is calculated from the irradiation pattern, and the calculated modulation amount is set for the LCOS 3 (step S407). More particularly, the modulation amount of phase is calculated and set for each pixel element.

Completing the settings, the computer 70 obtains an image while applying patterned irradiation to the fluorescent sample FS (step S409). In particular, the laser light source 1 emits light to form a pattern on the fluorescent sample FS in accordance with the modulation amount that has been set for the LCOS 3. Simultaneously, the galvanometer mirror 23 scans the fluorescent sample FS without light being emitted from the laser light source 21. That is, as illustrated in FIG. 12B, the galvanometer mirror 23 scans the fluorescent sample FS while the laser light source 1 is emitting laser light. Accordingly, fluorescence is detected at the PMT 44 only when a position scanned by the galvanometer mirror 23 is identical with a position irradiated with laser light via patterned irradiation. In addition, according to a signal from the PMT 44, which has detected fluorescence, and the control information of the galvanometer mirror 23, an image M32 of the fluorescent sample FS is generated and displayed on the monitor 80. FIG. 12C, which depicts the image M32 displayed on the monitor 80, illustrates four points (positions f1 to f4), i.e., positions irradiated with laser light via patterned irradiation.

Next, the computer 70 obtains an irradiation pattern from the image M32 (step S411). In particular, the information of the four points, the positions f1 to f4, is obtained.

Subsequently, the computer 70 calculates a correction parameter from the pattern set in step S405 and the pattern obtained in step S411 (step S413). The method for calculating the correction parameter is similar to that in the calibration process in FIG. 2 or FIG. 7.

Finally, the computer 70 stores the calculated correction parameter in the storage unit 71 (step S415) and ends the calibration process. As in the case of the calibration process illustrated in FIG. 2 or FIG. 7, the correction parameter is desirably stored in association with various conditions of patterned irradiation.

As with the calibration process illustrated in FIG. 2 or FIG. 7, the calibration process illustrated in FIG. 11 allows the optical apparatus 102 to be calibrated to form a desired irradiation pattern on a sample. In addition, the optical apparatus 102, i.e., an optical apparatus that performs the calibration process illustrated in FIG. 11, is capable of irradiating many points and is capable of performing patterned irradiation simultaneously with obtaining an image, so that a correction parameter that enables advanced coordinate transformation can be readily obtained in a short time in comparison with the case of other calibration processes.

Descriptions have been given of an exemplary situation in which the fluorescent sample FS is used in the calibration process illustrated in FIG. 11; however, the sample is not limited to the fluorescent sample FS, but any sample may be used. For example, replacing the dichroic mirror 30 and the dichroic mirror 40 with half mirrors allows the calibration process illustrated in FIG. 11 to be performed using a mirror as a sample.

<Embodiment 4>

FIG. 13 illustrates a configuration of an optical apparatus in accordance with the present embodiment. An optical apparatus 103 illustrated in FIG. 13 is different from the optical apparatus 101 in accordance with embodiment 2 illustrated in FIG. 9 in the sense that the optical apparatus 103 does not include the relay lens 4 and the galvanometer mirror 6 and that the 0th-order-light cut filter 5 is located between the dichroic mirror 30 and the lens 7*a* that forms the relay lens 7. The other components are similar to those of the optical apparatus 101.

As with the optical apparatus 101 in accordance with embodiment 2, the optical apparatus 103 may perform desired patterned irradiation by performing the patterned irradiation process illustrated in FIG. 3A after performing the calibration process illustrated in FIG. 2.

<Embodiment 5>

Figure 14:
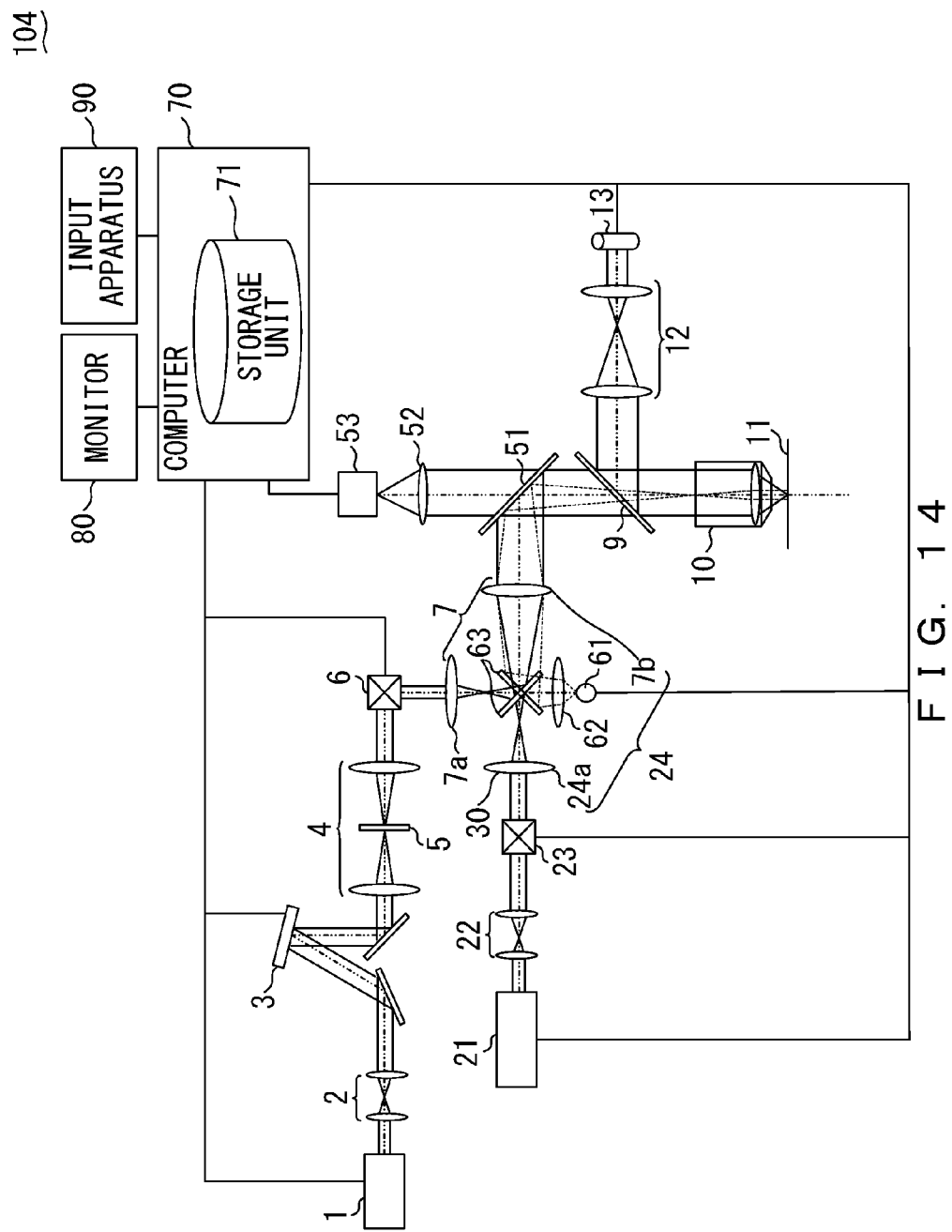
FIG. 14 illustrates a configuration of an optical apparatus in accordance with embodiment 5 of the present invention.

FIG. 14 illustrates a configuration of an optical apparatus in accordance with the present embodiment. An optical apparatus 104 illustrated in FIG. 14 is different from the optical apparatus 101 in accordance with embodiment 2 illustrated in FIG. 9 in the sense that the optical apparatus 104 includes a dichroic mirror 51 instead of the mirror 8; the optical apparatus 104 includes a switchable mirror 63 instead of the dichroic mirror 30 and includes epi-illumination optical means composed of a light source 61, a collector lens 62, and the switchable mirror 63; the optical apparatus 104 includes detection means composed of a tube lens 52 and a CCD image sensor 53 on which light receiving elements are two-dimensionally arranged; and the computer 70 is also connected to the CCD image sensor 53 and the light source 61. The epi-illumination optical means is Koehler illumination means. However, although the present embodiment will be described in accordance with Koehler illumination, the epi-illumination optical means does not necessarily need to perform Koehler illumination. The light source 61 is, for example, a high pressure mercury lamp. The CCD image sensor 53 is located at a position optically conjugate to a focal position of the objective 10 (the sample 11). The other components are similar to those of the optical apparatus 101.

As with the optical apparatus 101 in accordance with embodiment 2, the optical apparatus 104 may perform desired patterned irradiation by performing the patterned irradiation process illustrated in FIG. 3A after performing the calibration process illustrated in FIG. 2 or FIG. 7.

In addition, the optical apparatus 104 may be calibrated by performing another calibration process instead of the calibration process illustrated in FIG. 2 or FIG. 7.

FIG. 15 illustrates a flowchart of a calibration process performed by the optical apparatus of FIG. 14. FIG. 16A and FIG. 16B illustrate a calibration process performed by the optical apparatus of FIG. 14. In the following, with reference to FIG. 15, FIG. 16A, and FIG. 16B, specific descriptions will be given of the calibration process performed by the optical apparatus 104 in accordance with the present embodiment. Note that the calibration process depicted in FIG. 15 is performed via the computer 70 executing a control program stored in the storage unit 71.

First, a user of the optical apparatus 104 sets on a stage a fluorescent sample FS as the sample 11 (step S501).

When the fluorescent sample FS is set, the computer 70 obtains a reference image of the fluorescent sample FS using the CCD image sensor 53 (step S503). In particular, first, the dichroic mirror 9 is removed from the light path. Then, the light source 61 emits light to illuminate the fluorescent sample FS via Koehler illumination. The CCD image sensor 53 detects fluorescence generated from the fluorescent sample FS via irradiation with light from the light source 61, and, according to a signal from the CCD image sensor 53, an image M41, a reference image of the fluorescent sample FS, is generated. The image 41 is then displayed on the monitor 80.

Subsequently, checking the monitor 80 on which the image M41, i.e., the reference image, is displayed, the user of the optical apparatus 104 designates a pattern to be formed on the fluorescent sample FS by using the input apparatus 90. For example, as illustrated in FIG. 16A, the user designates four points (positions g1 to g4) on the image M41 and designates an irradiation pattern composed of the four points.

The computer 70 reads the pattern designated on the image M41 by the user and sets this pattern as an irradiation pattern of irradiation with laser light (step S505). In this example, the information of the four points, the positions g1 to g4, is set as the irradiation pattern. Then, the modulation amount of phase to be performed by the LCOS 3 is calculated from the irradiation pattern, and the calculated modulation amount is set for the LCOS 3 (step S507). More particularly, the modulation amount of phase is calculated and set for each pixel element.

Completing the settings, the computer 70 obtains an image with the CCD image sensor 53 while applying patterned irradiation to the fluorescent sample FS (step S509). In particular, first, the dichroic mirror 9 is removed from the light path. Next, the orientation of the switchable mirror 63 is changed, and the laser light source 1 then emits light to form a pattern on the fluorescent sample FS in accordance with the modulation amount that has been set for the LCOS 3. In addition, fluorescence generated from the fluorescent sample FS via pattered irradiation with laser light from the laser light source 1 is detected by the CCD image sensor 53, and, according to a signal from the CCD image sensor 53, an image M42 of the fluorescent sample FS is generated. The image M42 is then displayed on the monitor 80. FIG. 16B, which depicts the image M42 displayed on the monitor 80, illustrates a situation in which light is emitted from only four points (positions h1 to h4), i.e., the positions irradiated with laser light via patterned irradiation.

Next, the computer 70 obtains an irradiation pattern from the image M42 (step S511). In particular, the information of the four points, the positions h1 to h4, is obtained.

Subsequently, the computer 70 calculates a correction parameter from the pattern set in step S505 and the pattern obtained in step S511 (step S513). The method for calculating the correction parameter is similar to that in the calibration process in FIG. 2, FIG. 7, or FIG. 11.

Finally, the computer 70 stores the calculated correction parameter in the storage unit 71 (step S515) and ends the calibration process. As in the case of the calibration process illustrated in FIG. 2, FIG. 7, or FIG. 11, the correction parameter is desirably stored in association with various conditions of patterned irradiation.

As with the calibration process illustrated in FIG. 2 or FIG. 7, the calibration process illustrated in FIG. 15 allows the optical apparatus 104 to be calibrated to form a desired irradiation pattern on a sample. In addition, the optical apparatus 104, i.e., an optical apparatus that performs the calibration process illustrated in FIG. 15, allows a desired pattern to be formed on a sample even when an irradiation pattern is designated while checking an image obtained by the CCD image sensor 53.

FIG. 17 illustrates a flowchart of another calibration process performed by the optical apparatus of FIG. 14. FIG. 18A to FIG. 18D illustrate another calibration process performed by the optical apparatus of FIG. 14. In the following, with reference to FIG. 17 and FIG. 18A to FIG. 18D, specific descriptions will be given of another calibration process performed by the optical apparatus 104 in accordance with the present embodiment. Note that the calibration process depicted in FIG. 17 is performed via the computer 70 executing a control program stored in the storage unit 71.

First, a user of the optical apparatus 104 sets on a stage a lattice sample LS as the sample 11 (step S601).

When the lattice sample LS is set, the computer 70 obtains two reference images of the lattice sample LS using the PMT 13 and the CCD image sensor 53 (step S603). In particular, first, the laser light source 21 emits light, and the galvanometer mirror 23 scans the lattice sample LS with the laser light from the laser light source 21, as illustrated in FIG. 18A. Then, the PMT 13 detects observation light reflected from the lattice sample LS, and, according to a signal from the PMT 13 and the control information of the galvanometer mirror 23, an image M51 illustrated in FIG. 18A, i.e., the first reference image of the lattice sample LS, is generated. Next, the dichroic mirror 9 is removed from the light path, and the light source 61 then emits light. Subsequently, the CCD image sensor 53 detects observation light reflected from the lattice sample LS, and, according to a signal from the CCD image sensor 53, an image M52 illustrated in FIG. 18B, i.e., the second reference image of the lattice sample LS, is generated.

The computer 70 calculates a first correction parameter from the two reference images obtained in step S603 (step S605). In this example, coordinate information of four characteristic points is obtained from each of the two reference images, and the first correction parameter, a coefficient of projective transformation, is calculated from the obtained coordinate information of the four sets. The first correction parameter is used to correct a gap between the image obtained by the PMT 13 and the image obtained by the CCD image sensor 53.

Next, a user of the optical apparatus 104 sets on a stage a fluorescent sample FS as the sample 11 (step S607).

When the fluorescent sample FS is set, the computer 70 performs processes of steps S609 to S617. The processes of steps S609 to S617 are similar to those of steps S503 to S511 in FIG. 15, and hence their descriptions are omitted herein.

When the process of step S617 ends, the computer 70 calculates a second correction parameter from a pattern designated on an image M53 in FIG. 18C obtained in step S609 (positions i1 to i4) and a pattern in FIG. 18D obtained in step S617 (positions j1 to j4) (step S619). The second correction parameter is used to correct a gap between the irradiation pattern designated on the image obtained by the CCD image sensor 53 and the actual irradiation pattern of irradiation with laser light.

In addition, the computer 70 calculates a third correction parameter from the first correction parameter calculated in step S605 and the second correction parameter calculated in step S619 (step S621). The third correction parameter is used to correct a gap between the irradiation pattern designated on the image obtained by the PMT 13 and the actual irradiation pattern of irradiation with laser light.

Finally, the computer 70 stores the third correction parameter calculated in step S621 in the storage unit 71 (step S623) and ends the calibration process. In addition to the third correction parameter, the first and second correction parameters may be stored in the storage unit 71. The correction parameters are desirably stored in association with various conditions of patterned irradiation.

As with the calibration processes illustrated in FIG. 2, FIG. 7, and FIG. 15, the calibration process illustrated in FIG. 17 allows the optical apparatus 104 to be calibrated to form an irradiation pattern having a desired shape and a desired position on a sample. When an irradiation pattern is designated while checking an image obtained by the PMT 13, the optical apparatus 104, i.e., an optical apparatus that performs the calibration process illustrated in FIG. 17, allows a desired irradiation pattern to be formed on a sample using the third correction parameter in the patterned irradiation process illustrated in FIG. 6; when an irradiation pattern is designated while checking an image obtained by the CCD image sensor 53, the optical apparatus 104 allows a desired irradiation pattern to be formed on a sample using the second correction parameter in the patterned irradiation process illustrated in FIG. 6. Thus, a desired irradiation pattern may be formed on a sample without depending on detection means.

The aforementioned embodiments indicate specific examples to facilitate understanding of the invention, and the present invention is not limited to those embodiments. Various modifications and changes may be made to the optical apparatuses in accordance with the embodiments without departing from the spirit of the invention defined in the claims.

The embodiments were described with reference to calibration of an irradiation pattern of irradiation with excitation light by mainly focusing on a laser-scanning microscope that relies on two-photon excitation or one-photon excitation as an optical apparatus that uses a phase-modulation spatial modulator; however, an intensity-modulation spatial modulator may be used. In such a case, the intensity-modulation spatial modulator may be located at an image-conjugate position, i.e., a position conjugate to a sample.

The embodiments were also described on the assumption that a galvanometer mirror performs a scan with laser light, but the scan may be performed by moving a stage on which a sample is placed. That is, a scan may be performed by relatively shifting laser light and a sample.

What is claimed is:

1. An optical apparatus comprising:
   a laser light source;
   an objective configured to irradiate a sample with laser light from the laser light source;
   a phase-modulation spatial light modulator located at a position optically conjugate to a pupil position of the objective and configured to modulate a phase of the laser light;
   a scan unit configured to scan the sample with the laser light so as to generate an image of the sample;
   a detector configured to detect observation light from the sample;
   an image generating unit configured to generate the image of the sample according to a signal from the detector and control information of the scan unit; and
   a controlling unit configured to set, for the phase-modulation spatial light modulator, a modulation amount of modulation of the phase of the laser light in accordance with a pattern to be formed on the sample using the laser light,
   wherein based on a coefficient of coordinate transformation calculated according to the pattern to be formed on the sample and a pattern of irradiation with the laser light obtained from the image generated by the image generating unit, the controlling unit corrects the modulation amount that is set for the phase-modulation spatial light modulator.

2. The optical apparatus according to claim 1,
   wherein the sample is a fluorescent sample, and
   wherein the controlling unit: (i) obtains the pattern of irradiation with the laser light from an image of the fluorescent sample that has bleached due to the irradiation with the laser light, the image of the fluorescent sample being generated by the image generating unit, and (ii) based on the coefficient of coordinate transformation calculated according to the pattern to be formed on the fluorescent sample and the pattern of irradiation with the laser light, corrects the modulation amount to be set for the phase-modulation spatial light modulator.

3. An optical apparatus comprising:
a laser light source;
an objective configured to irradiate a sample with laser light from the laser light source;
a phase-modulation spatial light modulator located at a position optically conjugate to a pupil position of the objective and configured to modulate a phase of the laser light;
a scan unit configured to scan the sample with the laser light so as to generate an image of the sample;
a detector configured to detect observation light from the sample;
an image generating unit configured to generate the image of the sample according to a signal from the detector and control information of the scan unit; and
a controlling unit configured to set, for the phase-modulation spatial light modulator, a modulation amount of modulation of the phase of the laser light in accordance with a pattern to be formed on the sample using the laser light,
wherein according to the pattern to be formed on the sample and a pattern of irradiation with the laser light obtained from the image generated by the image generating unit, the controlling unit corrects the modulation amount that is set for the phase-modulation spatial light modulator,
wherein the scan unit is positioned between the objective and the phase-modulation spatial light modulator, and
wherein the controlling unit: (i) sets, for the phase-modulation spatial light modulator, the modulation amount corresponding to a pattern of laser-light irradiation of a position shifted from a reference position on the sample, the pattern of laser-light irradiation being the pattern to be formed on the sample, (ii) obtains the pattern of irradiation with the laser light from the image which the image generating unit generates via the scan unit scanning the sample with the laser light, and (iii) according to the pattern to be formed on the sample and the pattern of irradiation with the laser light, corrects the modulation amount to be set for the phase-modulation spatial light modulator.

4. The optical apparatus according to claim 1, further comprising:
light-path dividing means for forming a laser light path in which the phase-modulation spatial light modulator is positioned and an observation light path in which the detector is positioned; and
a confocal optical system positioned between the light-path dividing means and the detector,
wherein the scan unit is positioned between the light-path dividing means and the confocal optical system, and
wherein the controlling unit: (i) obtains the pattern of irradiation with the laser light from the image which the image generating unit generates via the scan unit scanning the laser light on the sample while the laser light is being emitted, and (ii) based on the coefficient of coordinate transformation calculated according to the pattern to be formed on the sample and the pattern of irradiation with the laser light, corrects the modulation amount to be set for the phase-modulation spatial light modulator.

5. The optical apparatus according to claim 1, further comprising light-path dividing means for forming a laser light path in which the phase-modulation spatial light modulator is positioned and an observation light path in which the detector is positioned, wherein the scan unit is positioned between the light-path dividing means and the detector.

6. The optical apparatus according to claim 1, further comprising a storage unit configured to store, for each wavelength of the laser light, a correction parameter calculated according to the pattern to be formed on the sample and the pattern of irradiation with the laser light obtained from the image generated by the image generating unit,
wherein according to the correction parameter corresponding to a given wavelength of the laser light from among the correction parameters stored in the storage unit, the controlling unit corrects the modulation amount that is set for the phase-modulation spatial light modulator.

7. The optical apparatus according to claim 1, further comprising a storage unit configured to store, for each of a plurality of objectives, a correction parameter calculated according to the pattern to be formed on the sample and the pattern of irradiation with the laser light obtained from the image generated by the image generating unit,
wherein according to the correction parameter corresponding to said objective from among the correction parameters stored in the storage unit, the controlling unit corrects the modulation amount that is set for the phase-modulation spatial light modulator.

8. The optical apparatus according to claim 1, further comprising a storage unit configured to store, for each irradiation range for a pattern to be formed on the sample, a correction parameter calculated according to the pattern to be formed on the sample and the pattern of irradiation with the laser light obtained from the image generated by the image generating unit,
wherein according to the correction parameter corresponding to the pattern to be formed on the sample from among the correction parameters stored in the storage unit, the controlling unit corrects the modulation amount that is set for the phase-modulation spatial light modulator.

9. An optical apparatus comprising:
a laser light source;
an objective configured to irradiate a sample with laser light from the laser light source;
a phase-modulation spatial light modulator located at a position optically conjugate to a pupil position of the objective and configured to modulate a phase of the laser light;
a scan unit configured to scan the sample with the laser light so as to generate an image of the sample;
a detector configured to detect observation light from the sample;
an image generating unit configured to generate the image of the sample according to a signal from the detector and control information of the scan unit; and
a controlling unit configured to set, for the phase-modulation spatial light modulator, a modulation amount of modulation of the phase of the laser light in accordance with a pattern to be formed on the sample using the laser light,
wherein according to the pattern to be formed on the sample and a pattern of irradiation with the laser light obtained from the image generated by the image generating unit, the controlling unit corrects the modulation amount that is set for the phase-modulation spatial light modulator, wherein the optical apparatus further comprises a storage unit configured to store, for each wavelength of the laser light, a correction parameter calculated according to the pattern to be formed on the sample and the pattern of irradiation with the laser light obtained from the image generated by the image generating unit, wherein according to the correction parameter corresponding to a given wavelength of the laser light from among the correction parameters stored in the storage unit, the controlling unit corrects the modulation amount that is set for the phase-modulation spatial light modulator, and wherein the correction parameter is a coefficient of coordinate transformation calculated according to the pattern to be formed on the sample and the pattern of irradiation with the laser light obtained from the image generated by the image generating unit.

10. The optical apparatus according to claim 1, wherein the scan unit is positioned between the objective and the phase-modulation spatial light modulator, and wherein the controlling unit: (i) sets, for the phase-modulation spatial light modulator, the modulation amount corresponding to a pattern of laser-light irradiation, the pattern of laser-light irradiation being the pattern to be formed on the sample, (ii) obtains the pattern of irradiation with the laser light from the image which the image generating unit generates via the scan unit scanning the sample with the laser light, and (iii) based on the coefficient of coordinate transformation calculated according to the pattern to be formed on the sample and the pattern of irradiation with the laser light, corrects the modulation amount to be set for the phase-modulation spatial light modulator.

11. The optical apparatus according to claim 1, wherein the detector is located at a given position that is optically conjugate to the pupil position of the objective.

\* \* \* \* \*